(12) United States Patent
Yao et al.

(10) Patent No.: US 12,549,114 B2
(45) Date of Patent: Feb. 10, 2026

(54) DEVICES AND METHODS FOR ENERGY HARVESTING FROM AIR HUMIDITY

(71) Applicant: University of Massachusetts, Boston, MA (US)

(72) Inventors: Jun Yao, Boston, MA (US); Xiaomeng Liu, Boston, MA (US)

(73) Assignee: University of Massachusetts, Westborough, MA (US)

( * ) Notice: Subject to any disclaimer, the term of this patent is extended or adjusted under 35 U.S.C. 154(b) by 158 days.

(21) Appl. No.: 18/306,860

(22) Filed: Apr. 25, 2023

(65) Prior Publication Data

US 2023/0344369 A1 Oct. 26, 2023

Related U.S. Application Data

(60) Provisional application No. 63/363,515, filed on Apr. 25, 2022.

(51) Int. Cl.
*H01G 7/00* (2006.01)
*H02N 11/00* (2006.01)

(52) U.S. Cl.
CPC .................. *H02N 11/002* (2013.01)

(58) Field of Classification Search
CPC ....... H02N 11/002; C02F 1/285; C02F 1/288; G01N 27/223
USPC .......................................................... 310/300
See application file for complete search history.

(56) References Cited

U.S. PATENT DOCUMENTS

| | | | |
|---|---|---|---|
| 7,498,155 B2 | 3/2009 | Lovley et al. | |
| 8,232,584 B2 | 7/2012 | Lieber et al. | |
| 8,608,921 B2 | 12/2013 | Li et al. | |
| 8,729,233 B2 | 5/2014 | Reguera et al. | |
| 8,846,890 B2 | 9/2014 | Reguera et al. | |
| 9,102,521 B2 | 8/2015 | Lieber et al. | |
| 9,234,508 B2 | 1/2016 | Sahin | |
| 9,601,227 B2 | 3/2017 | Reguera et al. | |
| 9,694,344 B2 * | 7/2017 | Song ..................... | B01J 20/305 |

(Continued)

FOREIGN PATENT DOCUMENTS

| | | |
|---|---|---|
| CN | 1527051 A | 9/2004 |
| CN | 108365776 A | 8/2018 |

(Continued)

OTHER PUBLICATIONS

Zhao, F., Cheng, H., Zhang, Z., Jiang, L. and Qu, L. (2015), Direct Power Generation from a Graphene Oxide Film under Moisture. Adv. Mater., 27: 4351-4357. https://doi.org/10.1002/adma.201501867 (Year: 2015).*

(Continued)

*Primary Examiner* — Burton S Mullins

(74) *Attorney, Agent, or Firm* — Hamilton, Brook, Smith & Reynolds, P.C.

(57) ABSTRACT

Energy harvesting devices and methods are provided. An energy harvesting device includes an adsorption layer comprising a nanoporous material and at least two electrodes in operative arrangement with the adsorption layer. The nanoporous material comprises a nonbiological nanoporous material, a nonprotein biological nanoporous material, or a combination thereof. The adsorption layer and at least two electrodes are configured to generate a voltage differential on exposure of the adsorption layer to ambient moisture.

15 Claims, 19 Drawing Sheets

(56) References Cited

U.S. PATENT DOCUMENTS

| | | | |
|---|---|---|---|
| 9,697,460 | B2 | 7/2017 | Collins et al. |
| 9,784,249 | B2 | 10/2017 | Li et al. |
| 10,083,974 | B1 | 9/2018 | Huang et al. |
| 10,311,357 | B2 | 6/2019 | Nugent et al. |
| 10,388,370 | B2 | 8/2019 | Schmidt et al. |
| 10,640,954 | B2 * | 5/2020 | Kim ............ B01D 15/36 |
| 10,684,244 | B2 | 6/2020 | Chen |
| 10,741,778 | B2 | 8/2020 | Kirsch et al. |
| 11,043,265 | B2 | 6/2021 | Li et al. |
| 11,063,227 | B2 | 7/2021 | Kirsch et al. |
| 11,066,449 | B2 | 7/2021 | Lovley et al. |
| 11,133,058 | B1 | 9/2021 | Philip et al. |
| 11,631,824 | B2 | 4/2023 | Yao et al. |
| 11,823,808 | B2 | 11/2023 | Lovley et al. |
| 11,982,637 | B2 | 5/2024 | Yao et al. |
| 12,215,374 | B2 | 2/2025 | Dastoor |
| 12,264,207 | B2 | 4/2025 | Chen et al. |
| 12,320,802 | B2 | 6/2025 | Lovley et al. |
| 2006/0057051 | A1 * | 3/2006 | Dai ............ C01B 32/05 423/445 R |
| 2006/0113880 | A1 | 6/2006 | Pei et al. |
| 2007/0157967 | A1 | 7/2007 | Mershin et al. |
| 2008/0283799 | A1 | 11/2008 | Alden et al. |
| 2009/0188784 | A1 | 7/2009 | Lee et al. |
| 2010/0119879 | A1 | 5/2010 | Girguis et al. |
| 2012/0053319 | A1 | 3/2012 | Reguera et al. |
| 2014/0239237 | A1 | 8/2014 | Reguera et al. |
| 2014/0330337 | A1 | 11/2014 | Linke et al. |
| 2014/0336357 | A1 | 11/2014 | Reguera et al. |
| 2018/0007819 | A1 | 1/2018 | Vajo et al. |
| 2018/0195997 | A1 | 7/2018 | Li et al. |
| 2018/0202964 | A1 | 7/2018 | Alam et al. |
| 2018/0371029 | A1 | 12/2018 | Lovley et al. |
| 2019/0094168 | A1 | 3/2019 | Jee et al. |
| 2019/0148085 | A1 | 5/2019 | Kim et al. |
| 2020/0090830 | A1 | 3/2020 | Lovley et al. |
| 2021/0002332 | A1 | 1/2021 | Malvankar et al. |
| 2021/0070811 | A1 | 3/2021 | Reguera et al. |
| 2021/0336169 | A1 | 10/2021 | Yao et al. |
| 2021/0341406 | A1 | 11/2021 | Yao et al. |
| 2021/0344286 | A1 * | 11/2021 | Yao ............ H02N 1/08 |
| 2023/0040959 | A1 | 2/2023 | Lovley et al. |
| 2023/0160885 | A1 | 5/2023 | Lovley et al. |

FOREIGN PATENT DOCUMENTS

| | | |
|---|---|---|
| KR | 10-1203181 B1 | 11/2012 |
| KR | 10-1768665 B1 | 8/2017 |
| WO | 2013/033456 A2 | 3/2013 |
| WO | 2017/015306 A2 | 1/2017 |
| WO | 2019/144931 A1 | 8/2019 |
| WO | 2019/169331 A1 | 9/2019 |
| WO | 2020/069523 A1 | 4/2020 |
| WO | 2020/191281 A1 | 9/2020 |
| WO | 2021/102327 A1 | 5/2021 |

OTHER PUBLICATIONS

Liu et al. "Induced Potential in Porous Carbon Films through Water Vapor Absorption", Angew Chem Int Ed Engl, Jul. 4, 2016;55(28): 8003-7. doi: 10.1002/anie.201602708. Epub May 9, 2016. (Year: 2016).*

Kim et al. "Water harvesting from air with metal-organic frameworks powered by natural sunlight" Science Apr. 13, 2017 vol. 356, Issue 6336, pp. 430-434. DOI: 10.1126/science.aam8743 (Year: 2017).*

Huang et al. ("Interface-mediated hygroelectric generator with an output voltage approaching 1.5 volts", Nat Commun. Oct. 9, 2018; 9(1):4166. doi: 10.1038/s41467-018-06633-z. PMID: 30301892; PMCID: PMC6177432. (Year: 2018).*

Hanikel et al. "Rapid cycling and exceptional yield in a metal-organic framework water harvester", ACS Cent. Sci. 5, pp. 1699-1706 (2019). (Year: 2019).*

Yin, Jun et al. "Hydrovoltaic Energy on the Way" Joule, vol. 4, Issue 9, pp. 1852-1855, Sep. 16, 2020. (Year: 2020).*

Hanikel "MOF water harvesters", Nature Nanotechnology, vol. 15, pp. 348-355 (2020). (Year: 2020).*

Tianda Fu & Xiaomeng Liu & Shuai Fu & Trevor Woodard & Hongyan Gao & Derek R. Lovley & Jun Yao, 2021. "Self-sustained green neuromorphic interfaces," Nature Communications, Nature, vol. 12(1), pp. 1-8, Dec. (Year: 2021).*

Wang et al. "Moisture adsorption-desorption full cycle power generation" Nat Commun 13, 2524 (2022). https://doi.org/10.1038/s41467-022-30156-3 (Year: 2022).* https://en.wikipedia.org/wiki/Adsorption (Year: 2024).*

X. Gao et al. "Electric power generation using paper materials", J. Mater. Chem. A, 2019, 7, 20574-20578. (Year: 2019).*

Adhikari et al., "Conductivity of individual Geobacter pili," RSC Advances., 2016, 6, 8354-8357.

Al-Abadleh, et al., "FT-IT study of water adsorption on aluminum oxide surfaces," Langmuir 19, 341-347 (2003).

Amrin et al., "Electrical properties and conduction mechanism in carboxylfunclionalized multiwalled carbon hanolubes/poly(vinyl alcohol) composites," J Maler Sci (2016) 51:2453-2464.

Bai, J. et al., "Sunlight-coordinated high-performance moisture power in natural condition," Adv. Mater. (2022) https://doi.org/10.1002/adma.202103897.

Balberg et al., "Excluded vol. and its relation to the onset of percolation," Physical Review B, vol. 30, No. 7, Oct. 1, 1984.

Bauhofer et al, "A review and analysis of electrical percolation in carbon nanolube polymer composites," Elsevier, Composites Science and Technology 69 (2009) 1486-1498.

Byrne et al., "Recent Advances in Research on Carbon Nanolube-Polymer Composites," Advanced Materials, 2010,22, 1672-1688.

Celzard et al,"Critical concentration in percolating systems containing a high-aspect-ratio filler," Physical Review 8, vol. 53, No. 10, Mar. 1, 1996.

Chandrakishore et al, "Facile synthesis of carbon nanolubes and their use in the fabrication of resistive switching memory devices," RSC Advances, 2014, 4, 9905-9911.

Chen et al., "Electrical Conductivity of Polymer Blends of Poly(3,4-ethylenedioxythiophene) : Poly (styrenesulfonate) :N-Methyl-2-pyrrolidinone and Polyvinyl Alcohol," Journal of Applied Polymer Science, vol. 125, 3134-3141 (2012).

Cheng, H. et al., "Spontaneous power source in ambient air of a well-directionally reduced graphene oxide bulk," Energy Environ. Sci. 11, 2839 (2018).

Childers et al., "Geobacter metallireducens accesses insoluble Fe(III) oxide by chemotaxis" Nature, vol. 416, Apr. 18, 2002, pp. 767-769.

Cho et al., "Synthesis and electrical properties of polymer composites with polyaniline nanoparticles," Elsevier, Materials Science and Engineering C 24 (2004) 15-18.

Coppi et al., "Development of a Genetic System for Geobacter sulfurreducens", Applied and Environmental Microbiology, vol. 67, No. 7, Jul. 2001, pp. 3180-3187.

English machine translation of Liu et al. (CN 108365776) (Year: 2018).

Fu, T. et al., "Self-sustained green neuromorphic interfaces," Nat. Commun. 12, 3351 (2021).

Fu, Tianda, et al, "Bioinspired bio-voltage memristors", Nature Communications, 2020, Article pp. 1-10 (Year: 2020).

Gangopadhyay et al., "Polyaniline-poly(vinyl alcohol) conducting composite: material with easy processability 2nd novel application potential," Elsevier, Synthetic Metals 123 (2001) 21-31.

Gerald F. Audette et al, "Protein Nanotubes: From Bio-nanotech towards Medical Applications", Jun. 2019, Biomedicines Journal, vol. 7/46. (Year: 2019).

Gielen, et al., "The role of renewable energy in the global energy transformation," Energy Strategy Rev. 24, 38-50 (2019).

Green et al, "Conductive Hydrogels: Mechanically Robust Hybrids for Use as Biomalerials," Macromolecular Bioscience, 2012, 12, 494-501.

Guo et al, "Flexible transparent conductors based on metal nanowire networks," Elsevier, Materials Today, vol. 18, No. 3, Apr. 2015.

(56) References Cited

OTHER PUBLICATIONS

Guterman, et al., "Toward Peptide-Based Bioelectronics: Reductionist Design of Conductive Pili Mimetics," Bioelectron Med (Lond.) May 2018: 1(2): 131-137.

Han, et al., "Facile synthesis of poly(3,4-ethylenedioxythiophene) nanofibers from an aqueous surfactant solution," Small 2, 1164-1169 (2006).

Jerry A. Fereira et al, "Tunneling explains efficient electron transport via protein junctions", Weizmann Institute of SCience Reports, Nov. 2017, vol. 114, No. 20 (Year: 2017).

Jiangfeng Zhou et al, "Development of nanowire-modified electrodes applied in the locally enhanced electric field treatment (LEEFT) for water disinfection", 2020, Journals of Materials Chemistry. Article (Year: 2020).

Kaunda, et al., "Hydropower in the context of sustainable energy supply: a review of technologies and challenges," ISRN Renewable Energy 2012, 730631 (2012).

Kumar, Anish, et al, "Protein Biosensors Based on Polymer Nanowires, Carbon Nanotubes and Zinc Oxide Nanorods", Sensors Journal, May 2011, 5087-5111 {Year: 2011).

Langmuir, "Vapor pressures, evaporation, condensation and adsorption," J. Am. Chem. Soc. 54, 2798-2832 (1932).

Li et al, "Ordered multiphase polymer nanocomposites for high-performance solid-slate supercapacitors," Elsevier, Composites: Part B 71 (2015), 40-44.

Liu et al, "Flexible supercapacitor sheets based on hybrid nanocomposite materials," Elsevier, Nano Energy (2013) 133-137.

Liu et al., "A Geobacter sulfurreducens Strain Expressing Pseudomonas aeruginosa Type IV Pili Localizes OmcS on Pili but Is Deficient in Fe(III) Oxide Reduction and Current Production", Applied and Environmental Microbiology, vol. 80, No. 3, Feb. 2014, pp. 1219-1224.

Liu, et al., "Biological Synthesis of High-Conductive Pili in Aerobic Bacterium Pseudomonas Aeruginosa," Applied Microbiology and Biotechnology (2019) 103:1535-1544.

Liu, et al., "Induced potential in porous carbon films through water vapor absorption," Angew. Chem. Int. Ed. 55, 8003-8007 (2016).

Liu, T. et al., "Regulating the interlayer spacing of graphene oxide membranes and enhancing their stability by use of PACl," Environ. Sci. Technol. 53, 11949-11959 (2019).

Liu, X. et al., "Multifunctional protein nanowire humidity sensors for green wearable electronics," Adv. Electron. Mater. 6, 2000721 (2020).

Liu, Xiaomeng, et al, "Power generation from ambient humidity using protein nanowires", Feb. 2020, pp. 550-556 (Year: 2020).

Lovely,D., et al, "Geobacter Protein Nanowires", Front. Microbial. 10, 2078 (2019).

Lovley et al., "Seeing is believing: novel imaging techniques help clarify microbial nanowire structure and function", Environmental microbiology, vol. 17, Issue 7, 2015, pp. 2209-2215.

Lovley, "e-Biologics: Fabrication of Sustainable Electronics with 'Green' Biological Materials," American Society for Microbiology, May/Jun. 2017, vol. 8, Issue 3 e00695-17.

Lovley, "Electrically conductive pili: Biological function and potential applications in electronics," Science Direct, Current Opinion in Electrochemistry 2017, 4: 190-198.

Lovley, et al., "Intrinsically conductive microbial nanowires for 'green' electronics with novel functions," Trends Biotechnol. 39, 940-952 (2021).

Makhlouki et al., "Transport Properties in Polypyrrole-PVA Composites: Evidence for Hopping Conduction," Journal of Applied Polymer Science, vol. 44, 443-446 (1992).

Malhofer et al., "Direct visualization of percolation paths in carbon nanolube/polymer composites," Elsevier, Organic Electronics 45 (2017) 151-158.

Malvankar et al., "Lack of cytochrome involvement in long-range electron transport through conductive biofilms and nanowires of Geobacter sulfurreducens", Energy & Environmental Science, vol. 5, 2012, pp. 8651-8686.

Malvankar et al., "Microbial nanowires for bioenergy applications", Current Opinion in Biotechnology, vol. 27, 2017, pp. 88-95.

Malvankar et al., "Microbial Nanowires: A New Paradigm for Biological Electron Transfer and Bioelectronics", ChemSusChem Concepts, vol. 5, 2012, pp. 1039-1046.

Malvankar et al., "Structural Basis for Metallic-Like Conductivity in Microbial Nanowires," Mar./Apr. 2015 mBio vol. 6 Issue 2 e00084-15.

Malvankar et al., "Tunable metallic-like conductivity in microbial nanowires", Nature Nanotechnology, vol. 6, Sep. 2011, pp. 573-579.

Malvankar et al., "Visualization of charge propagation along individual pili proteins using ambient electrostatic force microscopy" Nature Nanotechnology, vol. 9, Dec. 2014, pp. 1-10.

Marquez, A et al., "Nanoporous silk films with capillary action and size-exclusion capacity for sensitive glucose determination in whole blood," Lab Chip 21, 608-615 (2021).

Miaudet et al, "Thermo-electrical properties of PVA-nanotube composite fibers," Elsevier, ScienceDirect, Polymer 48 (2007) 4068-4074.

Milano, Gianluca, et al, "Self-limited single nanowire systems combining all-in—One memristive and neuromorphic functionalities", Dec. 2018, Nature Communications, Article No. 5151. pp. 1-10 (Year: 2018).

Nevin et al., "Anode Biofilm Transcriptomics Reveals Outer Surface Components Essential for High Density Current 14 Production in Geobacter sulfurreducens Fuel Cells", PLoS ONE, vol. 4, Issue 5, May 2009, pp. 1-11.

Nevin et al., "Power output and columbic efficiencies from biofilms of Geobacter sulfurreducens comparable to mixed 15 community microbial fuel cells", Environmental Microbiology, vol. 10, No. 10, 2008, pp. 2505-2514.

Ogura et al.,"A Conductive and Humidity-Sensitive Composite Film Derived from Poly(o-phenylenediamine) and Polyvinyl Alcohol," J. Electrochem. Soc., vol. 142, No. 9, Sep. 1995.

Pang, et al, "The pressure exerted by a confined ideal gas," J. Phys. A: Math. Theor. 44, 365001 (2011).

Paradiso, et al., "Energy scavenging for mobile and wireless electronics," IEEE Pervasive Comp. 4, 18-27 (2005).

Qin, Y. et al., "Constant electricity generation in nanostructured silicon by evaporation-driven water flow," Angew. Chem. Int. Ed 59, 10619-10625 (2020).

Reardon, P.N. and Mueller, K.T., "Structure of the Type IVa Major Pilin from the Electrically Conductive Bacterial Nanowires of Geobacter sulfurreducens," The Journal of Biological Chemistry, vol. 288; No. 41; 29250-29256 (2013).

Reguera et al., "Extracellular electron transfer via microbial nanowires," Nature, Letters, vol. 435, 23, 1098-1101, Jun. 2005.

Ren, G. et al., "A facile and sustainable hygroelectric generator using whole-cell Geobacter sulfurreducens," Nano Energy 89, 106361 (2021).

Revil, et al., "Theory of ionic-surface electrical conduction in porous media," Phys. Rev. B 55, 1757-1773 (1997).

Rezende, et al., "Detection of charge distributions in insulator surfaces," J. Phys. Condens. Matter 21, 263002 (2009).

Richter 2011; Mutational Analysis of Geopilin Function in Geobacter sulfurreducens; Dissertation University of Massachusetts; Open Access Dissertations. 378. https://scholarworks.umass.edu/open_access_dissertations/378; (Year: 2011).

Rico, A.L. et al., "Functional reconstitution of the type IVa pilus assembly system from enterohaemorrhagic *Escherichic coli*," Mol. Microbiol., vol. 111; No. 3; 732-749 (2019).

Shen, et al., "Moisture-enabled electricity generation: from physics and materials to self-powered applications," Adv. Mater. 32, 2003722 (2020).

Shih et al., "Tryptophan-Accelerated Electron Flow Through Proteins", Science, vol. 320, Jun. 27, 2008, pp. 1760-1762.

Sisman, et al., "Quantum boundary layer: a non-uniform density distribution of an ideal gas in thermodynamic equilibrium," Phys. Lett. A 362, 16-20 (2007).

Sisman, et al., "The Casimir-like size effects in ideal gases," Phys. Lett. A 320, 360-366 (2004).

Stokes, et al., "A Standard solutions for humidity control at 25° C.," Ind. Eng. Chem. 41, 2013 (1949).

(56) References Cited

OTHER PUBLICATIONS

Sun et al, "Flexible polydimethylsiloxane/multi-walled carbon nanotubes membranous metacomposites with negative permittivity," Elsevier, Polymer 125 (2017) 50-57.

Sun, Z. et al., "Emerging design principles, materials, and applications for moisture-enabled electric generation," eScience (2022) https://doi.org/10.1016/j.esci.2021.12.009.

Tan et al., "Synthetic Biological Protein Nanowires with High Conductivity," small 2016, 12, No. 33, 4481-4485.

Tan et al., "Expressing the Geobacter metallireducens PilA in Geobacter sulfurreducens Yields Pili with Exceptional Conductivity," American Society for Microbiology, Jan./Feb. 2017, vol. 8, Issue 1 e02203-16.

Tang et al, "Effect of pH on Protein Distribution in Electrospun PVA/BSA Composite Nanofibers," 2012 American Chemical Society, 1269-1278.

Tang, et al., "Compilation and evaluation of gas phase diffusion coefficients of reactive trace gases in the atmosphere: vol. 2. Diffusivities of organic compounds, pressure-normalized mean free paths, and average Knudsen numbers for gas uptake calculations," Atoms. Chem. Phys. 15, 5585-5598 (2015).

The Protein Man (https://info.gbiosciences.com/blog/bid/198500/8-protein-tags-explained; 2014).

Tseng et al., "Digital memory device based on tobacco mosaic virus conjugated with nanoparticles," nature hanotechnology, vol. 1., Oct. 2006, pp. 72-77.

Ueki T., et al., "An *Escherichia coli* Chassis for Production of Electrically Conductive Protein Nanowires," 9(3):647-654 ACS Synth Biol. (2020).

Ueki T., et al., "Decorating the Outer Surface of Microbially Produced Protein Nanowires with Peptides," ACS Synth Biol. X;8{8}:1809-1817 (2019).

Ueki, Toshiyuki, et al. "Decorating microbially produced protein nanowires with peptide ligands." bioRxiv (2019): 590224.

Vargas et al., "Aromatic Amino Acids Required for Pili Conductivity and Long-Range Extracellular Electron Transport in Geobacter sulfurreducens", mBio, vol. 4, Issue 2, Mar./Apr. 2013, pp. 1-6.

Walker et al., "Electrically conductive pili from pilin genes of phylogenetically diverse microorganisms," The ISME Journal (2018) 12, 48-58.

Wu, S., et al, "Regulation of expression of pilA gene in Myxococcus xanthus," Journal of Bacteriology, 179 (24): 7748-7758 (1997).

Yang, Yen-Chun, et al, "PilR enhances the sensitivity of Xanthomonas axonopodis pv. citri to the infection of filamentous bacteriophage Cf," Current Microbiology, 48(4):251-261 (2004).

Yi Cui et al, "Nanowire Nanosensors for Highly Sensitive and Selective Detection of Biological and Chemical Species", Aug. 2021, Science Magazine, vol. 293, pp. 1289-1292. (Year: 2021).

Yin, B., et al., "Bioinspired and bristled microparticles for ultrasensitive pressure and strain sensors," Nat. Commun. 9, 5161 (2018).

Zezelj et al., Publishes Note: From percolating to dense random stick networks: Conductivity model nvestigation [Phys. Rev_ B 86, 134202 (2012)]. Physical Review B 86, 139904(E) (2012).

Zhang et al., "Composite films of nanostructured polyaniline with poly(vinyl alcohol)," Elsevier, Synthetic Metals 12E (2002) 83-89.

Zhang et al., "Electrical and dielectric behaviors and their origins in the three-dimensional polyvinyl alcohol/MWCN-Composites with low percolation threshold," Elsevier, Carbon 47 (2009) 1311-1320.

Zhang, et al., "Digestion of ambient humidity for energy generation," Joule 4, 2532-2536 (2020).

Zhang, et al., "Emerging hydrovoltaic technology," Nat. Nanotechnol. 13, 1109-1119 (2018).

Zhang, et al., "Sub-10 nm wide cellulose nanofibers for ultrathin nanoporous membranes with high organic permeation," Adv. Funct. Mater. 26, 792-800 (2016).

Zhao, F. et al., "Direct power generation from a graphene oxide film under moisture," Adv. Mater. 27, 4351-4357 (2015).

Zhou, et al., "Origin of the chemical and kinetic stability of graphene oxide," Sci. Rep. 3, 2484 (2013).

\* cited by examiner

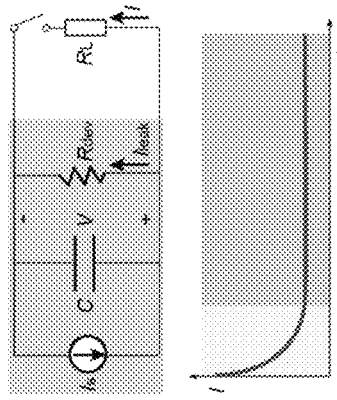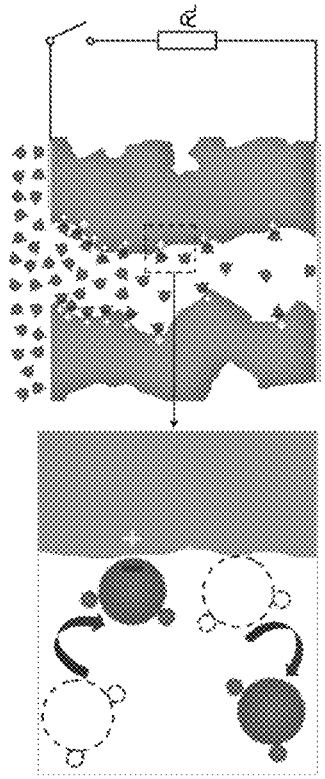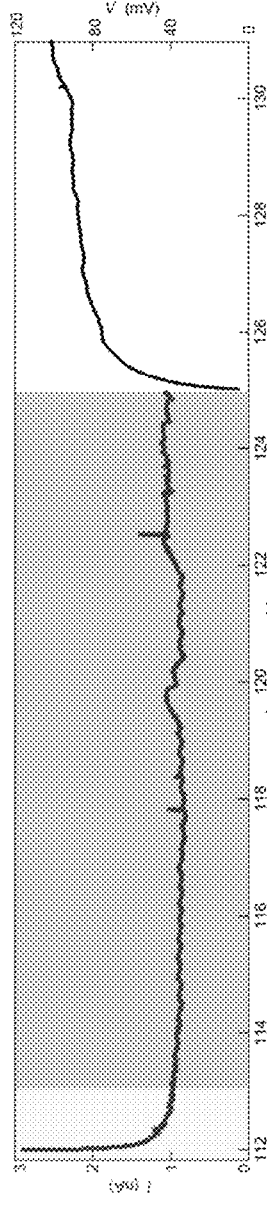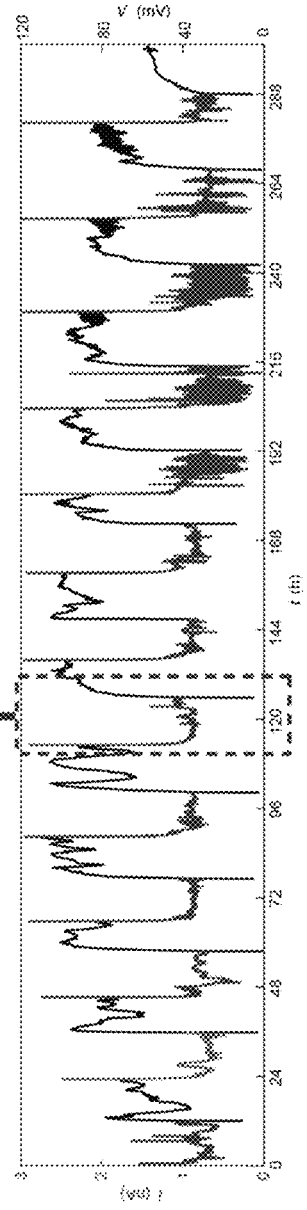

DEVICES AND METHODS FOR ENERGY HARVESTING FROM AIR HUMIDITY

RELATED APPLICATION

This application claims the benefit of U.S. Provisional Application No. 63/363,515, filed on Apr. 25, 2022. The entire teachings of the above application are incorporated herein by reference.

GOVERNMENT SUPPORT

This invention was made with government support under Grant No. DMR2027102 awarded by the National Science Foundation. The government has certain rights in the invention.

BACKGROUND

Energy harvesting from ubiquitous environmental sources can mitigate the threats associated with fossil fuels and can provide for flexible powering solutions, such as for the broad deployment of internet of things. Hydroelectricity has been an important part of clean energy, but requirements for a large body of water and specific geological conditions limit its broad applicability. The water in air, or humidity, can be much more accessible and forms a large, ubiquitous, sustainable energy source. Several emerging technologies have been designed for harvesting energy from air humidity. Current systems have several drawbacks, and there exists a need for improved methods and devices for harvesting energy from ambient moisture.

SUMMARY

Energy harvesting devices that can provide for continuous generation of electric current in an ambient environment are provided. The provided energy harvesting devices can be more easily manufacturable, more easily customizable, and more easily deployable than existing alternatives.

An energy harvesting device includes an adsorption layer comprising a nanoporous material. The nanoporous material can comprise a nonbiological nanoporous material, a nonprotein biological nanoporous material, or a combination thereof. The device further includes at least two electrodes in operative arrangement with the adsorption layer. The adsorption layer and at least two electrodes configured to generate a voltage differential on exposure of the adsorption layer to ambient moisture.

The adsorption layer can be a heterogeneous adsorption layer comprising at least two nanoporous materials, including, for example, protein nanowires in combination with a nonbiological nanoporous material and/or a nonprotein biological material. The at least two nanoporous materials can be vertically arranged with respect to one another, arranged in a planar format with respect to one another, or are arranged in a combination thereof.

Where the nanoporous material is or includes a nonbiological material, the nonbiological material can be organic, in organic, or a combination thereof. Examples of nonbiological nanoporous materials include poly(3,4-ethylenedioxythiophene) (PEDOT), poly(3-hexylthiophene) (P3HT), polyvinyl alcohol (PVA), Polylactic acid (PLA), poly vinyl phenol (PVP), Polyacrylonitrile (PAN), metal organic frameworks (MOFs), graphene oxide (GOx), anodic aluminum oxide (AAO), carbon nanoparticles, silicon nanowires, carbon nanotubes, and zeolites. Where the nanoporous material is or includes a biological material, the biological material can be a nonprotein material. Examples of nonprotein nanoporous materials includes cellulose, collagen, RNA/DNA, chitosan, agarose, pectin, starch, and fucoidan.

The nanoporous material can be configured to generate an adsorption gradient of $H_2O$ within the device on exposure to humidity. Nanoscale structures defining pores of less than about 500 nm, or less than about 200 nm can be provided by the material. A thickness of the adsorption layer is in a range of about 0.5 µm to about 500 µm. Optionally, the pores of a device can extend through the thickness of the adsorption layer.

An energy harvesting device can further include a storage element (e.g., a capacitor, a battery, etc.) configured to store energy from current supplied by the adsorption layer and the at least two electrodes.

The nanoporous material can include at its surface at least one surface group capable of interacting with water molecules. For example, the surface group can be a hydroxyl group, a carbonyl group, a carboxyl group, or an amino group. The surface group can be a hydroscopic functional group.

The at least two electrodes can be disposed at opposing surfaces of the adsorption layer, at opposing ends of the adsorption layer, or a combination thereof.

A method of harvesting energy from ambient moisture includes exposing an adsorption layer comprising a nanoporous material to ambient moisture and, with at least two electrodes in operative arrangement with the adsorption layer, generating a voltage differential on exposure of the adsorption layer to the ambient moisture. The method can further include storing energy from current supplied by the adsorption layer and the at least two electrodes.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

where A and λ are the top-interface adsorption and characteristic thickness, respectively. The fitting value of average adsorption (dashed black line, corresponding to measured $W_{H2O}\%$) is provided by:

$$\overline{f(d)} = \frac{\lambda \cdot A}{d} \cdot \left(1 - e^{-\frac{d}{\lambda}}\right) \quad (2)$$

Row (iv) illustrates fitted adsorption differences between the top and bottom interfaces (light grey curve) and measured voltage output $V_o$ (black curve) with respect to different film thicknesses in each film. The fitted adsorption difference is as follows:

$$\Delta W_{H2O}\% = A \cdot (1 - e^{-d/\lambda}) \quad (3)$$

All the measurements were performed in the ambient environment with a relative humidity (RH) ~50%.

Figure 3:
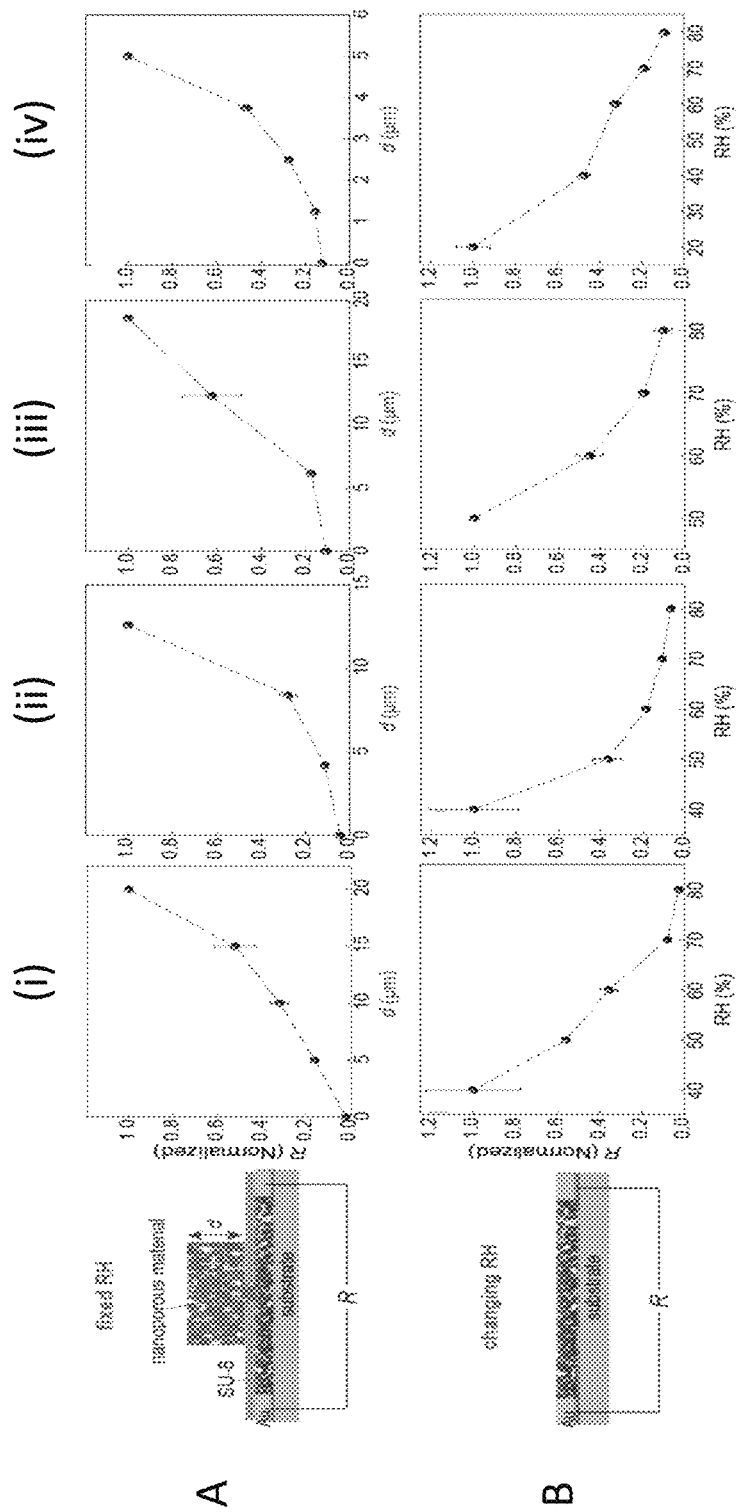

FIG. 3 is a chart illustrating depth-dependent (dynamic) water adsorption in nanoporous films and providing a comparison thereof. Columns (i)-(iv) illustrate results obtained from thin films made from, respectively, (i) CNFs, (ii) SFs, (iii) *G. sulfurreducens* biofilm, and (iv) GOx. Row (A) illustrates a schematic of the experimental setup and results of fixed RH experiments. The experimental setup included a thin layer (~1 μm thick, 1×1 cm²) of nanoporous film deposited on a Si/SiO₂ substrate, electrically addressed by a pair of Au electrodes (for resistance measurement). A water-impermeable thin layer (SU-8, ~2 μm thick) was covered on the thin film, with a small opening (1×1 mm²) connecting to the top layer of same material. This small opening allowed moisture diffusion but minimized the conduction contribution from the top layer to the bottom layer. Therefore, the resistance change in the bottom thin layer, if any, would be mainly contributed from water adsorption. Monolithic increase of resistance (R) with the increase of buried depth (d, or top-film thickness) in the thin films is shown. Row (B) illustrates a schematic of the experimental setup and results of changing RH experiments. The results show that the resistance R in all the thin films was inversely related to moisture adsorption, by exposure of the thin films to various RH levels, which was consistent with general observation in thin-film materials.

Figure 4:
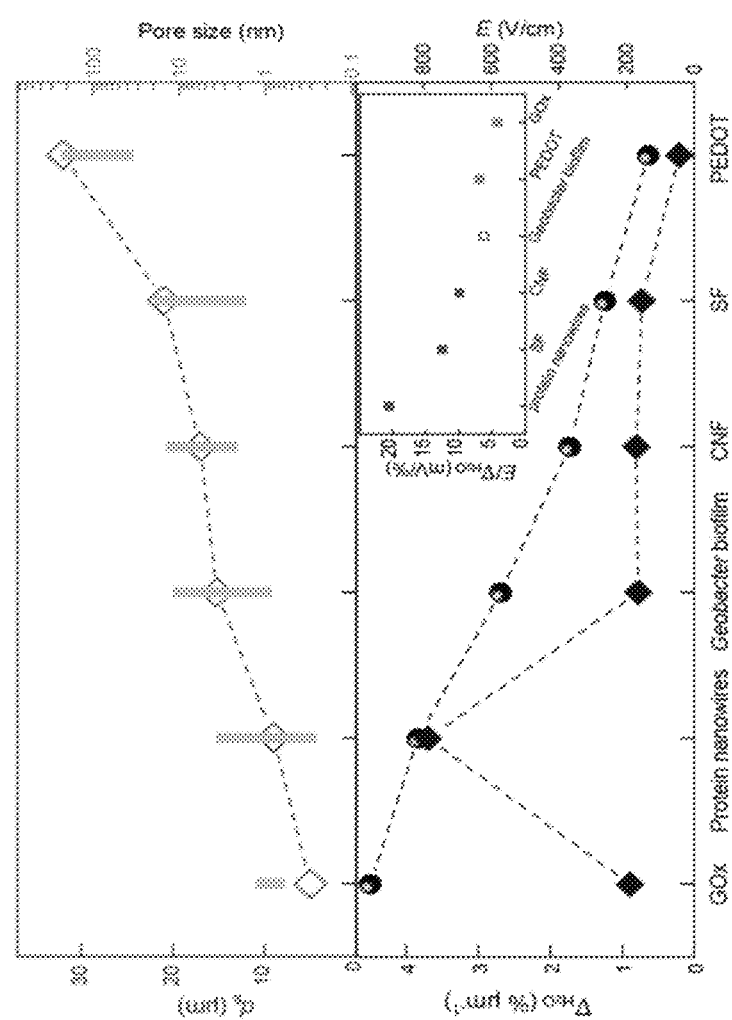

FIG. 4 is a graph illustrating a comparison of parameters in air-gen devices made from different materials. The top portion of the graph illustrates saturation thickness $d_s$ (triangular markings) with respect to pore-size range (gray) in different materials. The $d_s$, corresponding to a depth with its adsorption value reducing to 10% of the top-interface adsorption, was taken as 2.3λ extrapolated from FIG. 2 (row (iii) and columns A-E). The pore-size ranges in different materials were obtained either by imaging or from previous reports. The bottom portion of the graph illustrates adsorption gradient $\nabla_{H2O}$ (black, circles) and generated electric field E (grey, boxes) in different materials. The values were calculated based on data in FIG. 2. The inset illustrates calculated $E/\nabla_{H2O}$ ratio in different materials, with the dark grey and light grey indicating biomaterials and nonbiological materials, respectively. The Geobater biofilm (open, dark grey) has reduced $E/\nabla_{H2O}$ compared to other biomaterials, likely due to that the relatively large grain of cell body reduces the efficiency. The data in protein nanowire films was obtained from a previous study.

FIGS. 5A-5F illustrate current generation in an example air-gen device. FIG. 5A is a schematic illustrating charge donation and induction associated with the dynamic water exchange at the solid interface. FIG. 5B is a schematic illustrating charging in the nanoporous material. The outer layer is donated with more charge than the inner layer due to the water adsorption gradient. FIG. 5C is diagram illustrating a proposed leaky capacitor model (shaded region) for the air-gen device. FIG. 5D is a graph illustrating qualitative current behavior from the circuit model in FIG. 5C when the switch is closed (t=0). FIG. 5E is a graph of measured current I (left-side curve) from an air-gen device made from GOx (0.5×0.5 cm2, 6 μm thick) when the top and bottom electrodes were short-circuited. The measured voltage V (right-side curve) gradually restored to the original open-circuit value when the two electrodes were disconnected. FIG. 5F is a graph of the continuous discharging-and-charging cycles measured in the same air-gen device in FIG. 5E. The measurements were carried out in the ambient environment with RH ~50%.

Figure 6:
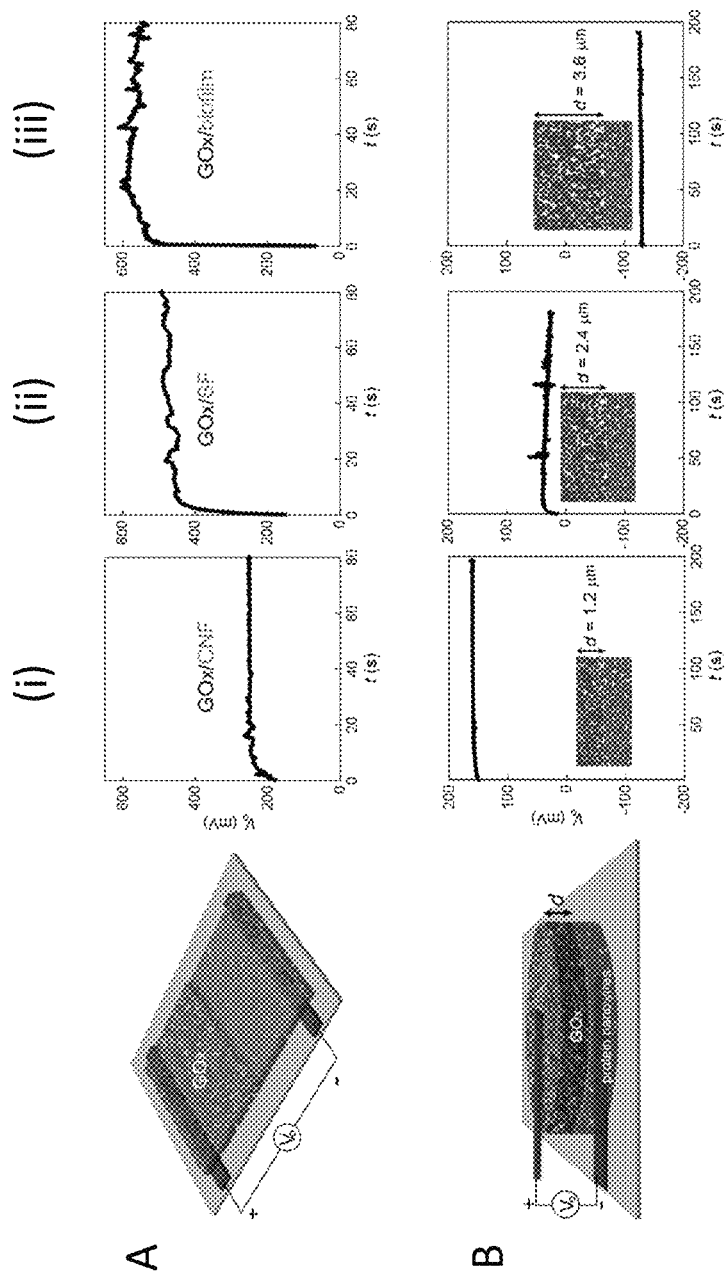

FIG. 6 is a chart illustrating voltage outputs of various heterogenous air-gen devices and providing a comparison thereof. Columns (i)-(iii) illustrate results obtained from thin films made from, respectively, (i) GOx and CNF, (ii) GOx and SF, and (iii) GOx and *G. sulfurreducens* biofilm. Row (A) illustrates a schematic of the experimental setup of a heterogenous device in a planar configuration and results thereof. The heterogeneous air-gen device is made from a GOx thin film (2×5 mm2, 1.2 μm thick) connected to another thin film (green) made from biomaterials (2×5 mm2), with each film sitting on an inert carbon electrode. The open-circuit voltage output ($V_o$) measured from heterogeneous air-gen devices with the biomaterial films made from (i) CNF (5 μm thick), (ii) SF (4.2 μm thick), and (iii) *G. sulfurreducens* biofilm (6.2 μm thick) are shown. Row (B) illustrates a schematic of the experimental setup of a heterogenous device in a vertical, or stacked, configuration and results thereof. The heterogeneous air-gen device is made from a GOx film stacked on a protein nanowire film. The $V_o$ measured from vertical heterogeneous air-gen devices with varied GOx thicknesses of (i) 1.2 μm, (ii) 2.4 μm, and (iii) 3.6 μm, respectively. All the measurements were performed in the ambient environment with RH ~30%.

Figure 7:
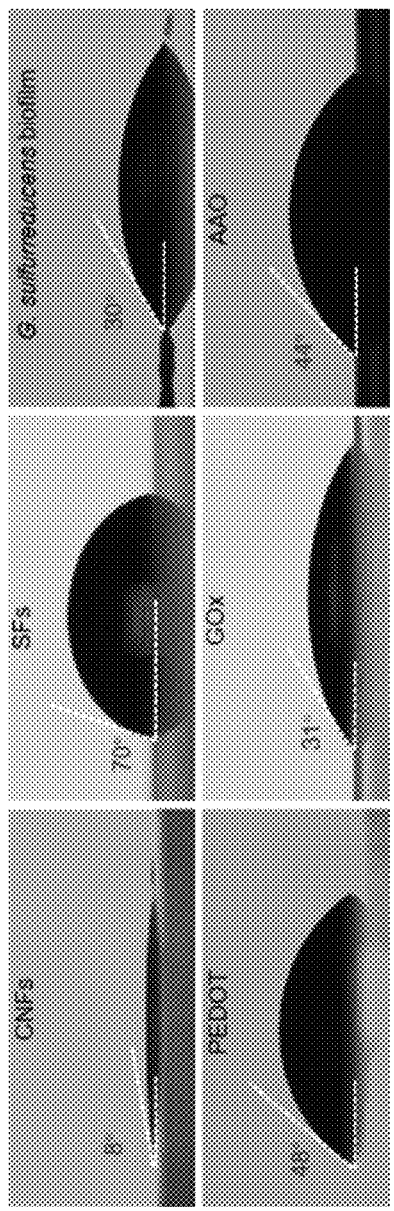

FIG. 7 illustrates contact angles in nanoporous thin films made from cellulose nanofibers (CNFs), silk fibroin (SFs), *G. sulfurreducens* biofilm, PEDOT nanowires, graphene oxides (GOx), and anodic aluminum oxide (AAO).

Figure 8A:
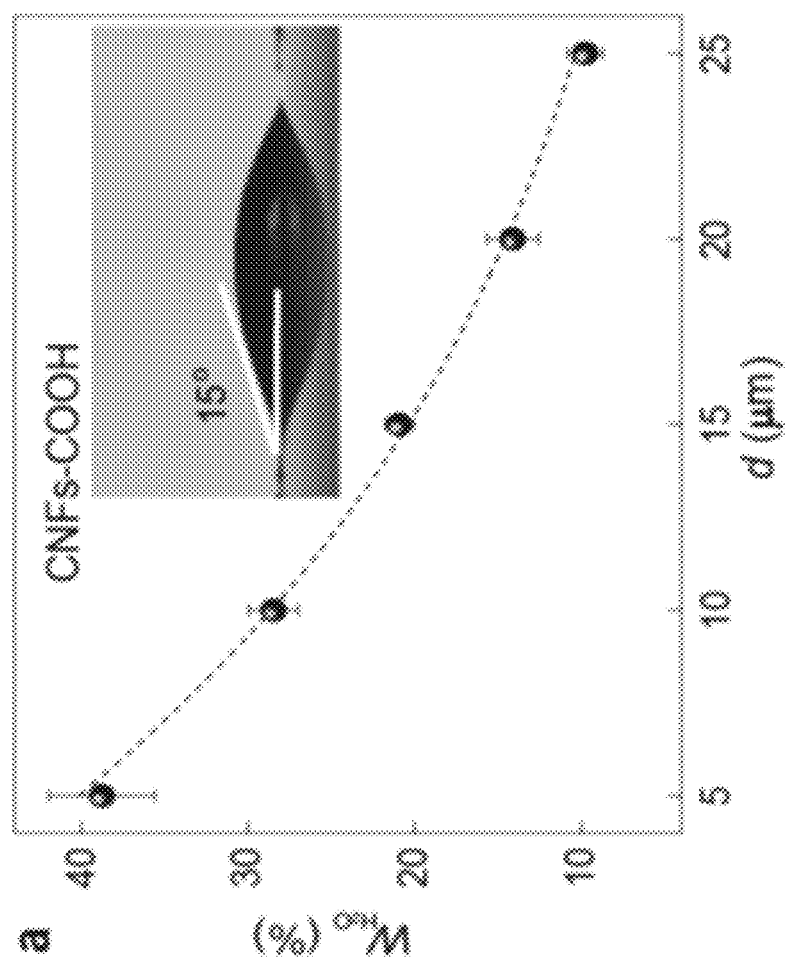
Figure 8B:
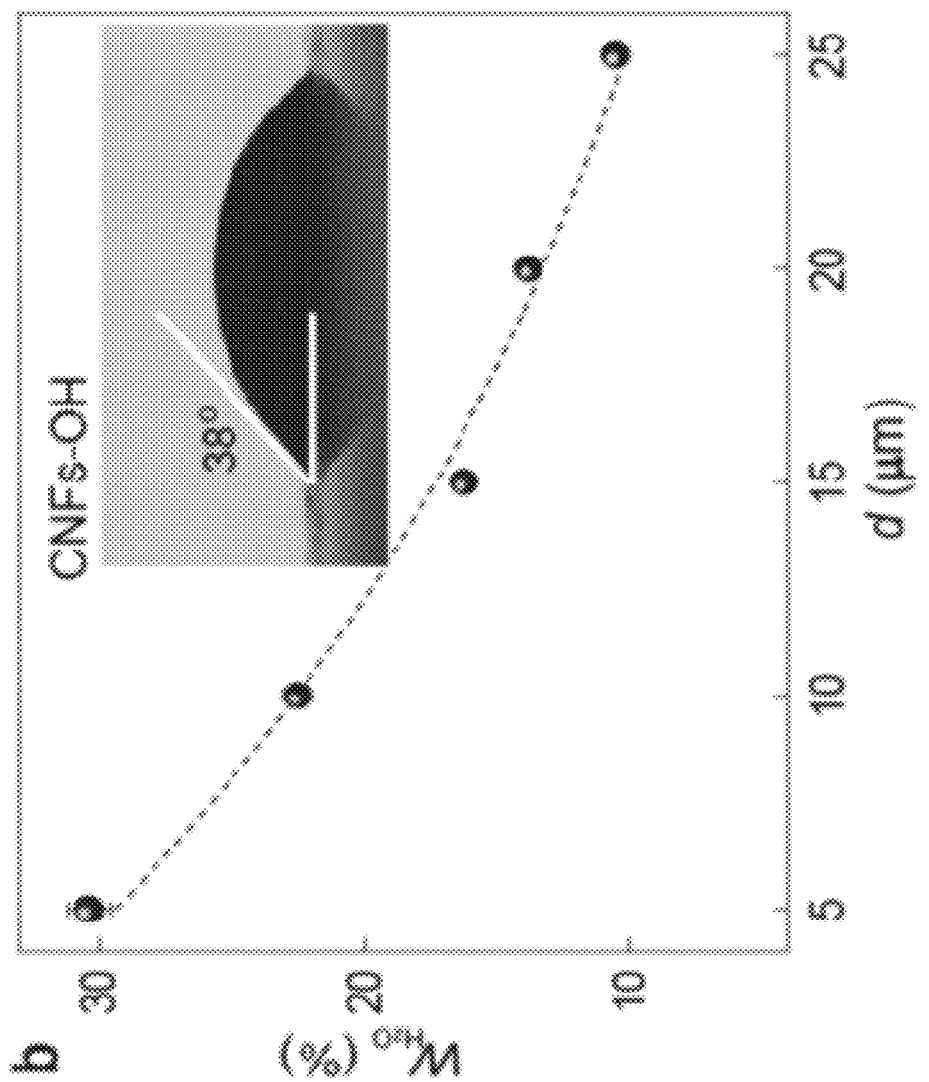
Figure 8C:
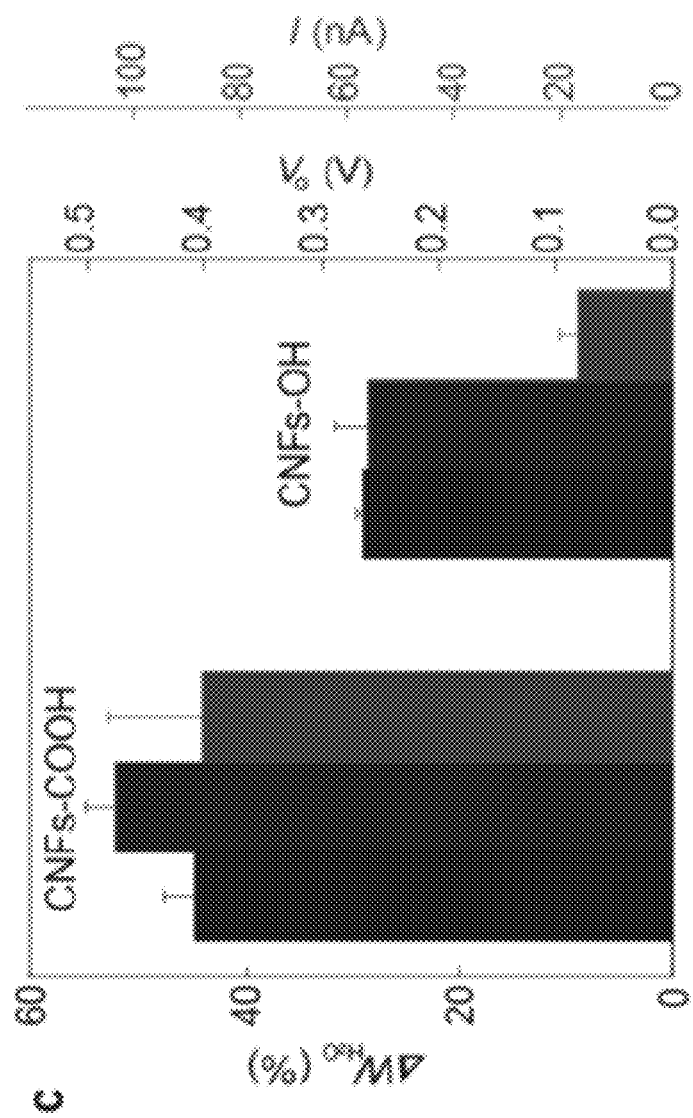

FIGS. 8A-8C illustrate an observed effect of surface functionalization. Cellulose nanofibers (CNFs) of the same structural parameters (5-20 nm diameter, 140-200 nm length) were obtained from Cellulose Lab. FIGS. 8A and 8B illustrate contact-angle measurements (insets) and showed that thin film assembled from CNFs having dominant carboxyl groups (FIG. 8A, CNFs-COOH; CNC-CM-SD, Cellulose Lab) showed improved surface hydrophilicity compared with thin film assembled from CNFs having dominant hydroxyl groups (FIG. 8 BCNFs-OH; CNC-DS-SD, Cellulose Lab), consistent with study showing that-COOH group has stronger interaction with water than-OH group. Adsorption measurements by QCM also showed that CNFs-COOH thin films of different thicknesses (d) had improved water adsorption (WH2O%) compared to CNFs-OH thin films. FIG. 8C is a graph of results demonstrating that air-gen devices made from CNFs-COOH showed enhanced $\Delta W_{H2O}$% (black bars), open-circuit voltage ($V_o$, dark grey bars), and short-circuit current (I, light grey bars), compared to air-gen devices made from CNFs-OH. All the devices had the same size of 5×5 mm2, thickness of 25 µm, and Au electrodes. All the measurements were performed at RH ~50%.

Figure 9A:
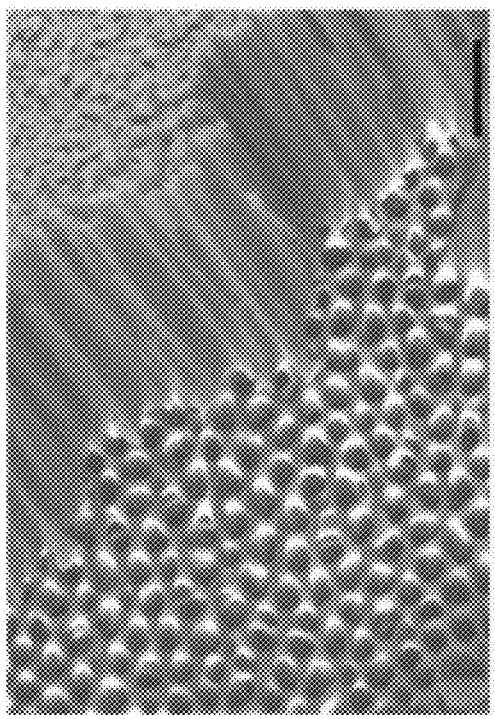
Figure 9B:
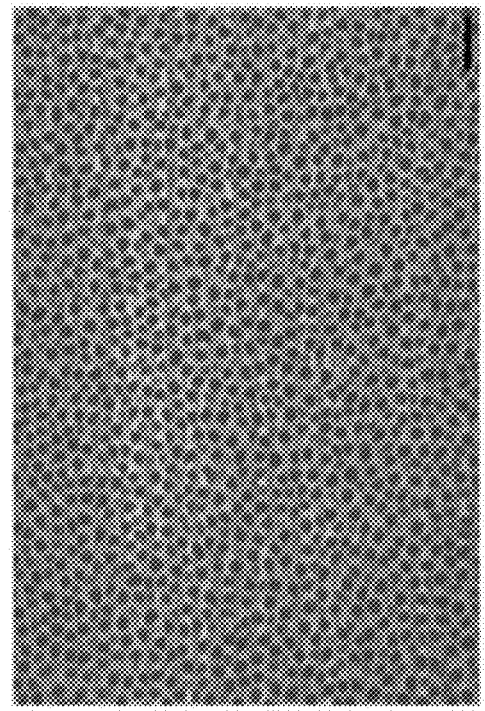
Figure 9C:
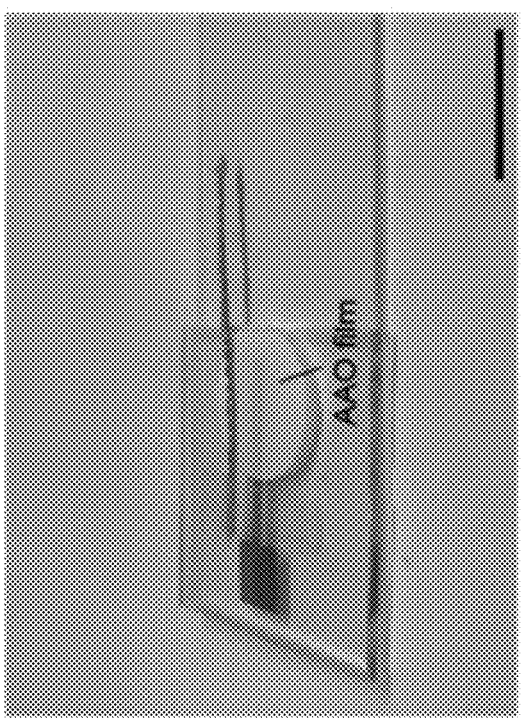
Figure 9D:
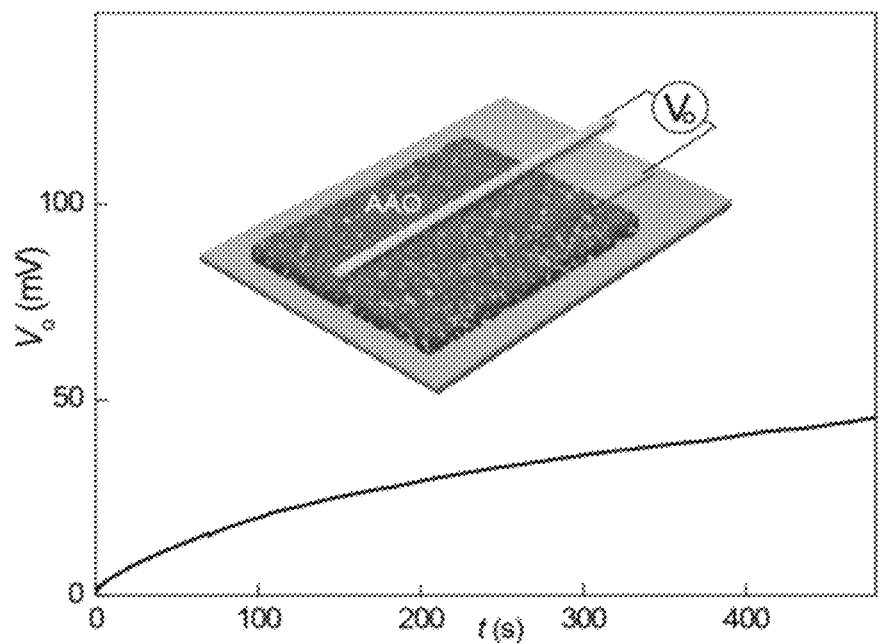
Figure 9E:
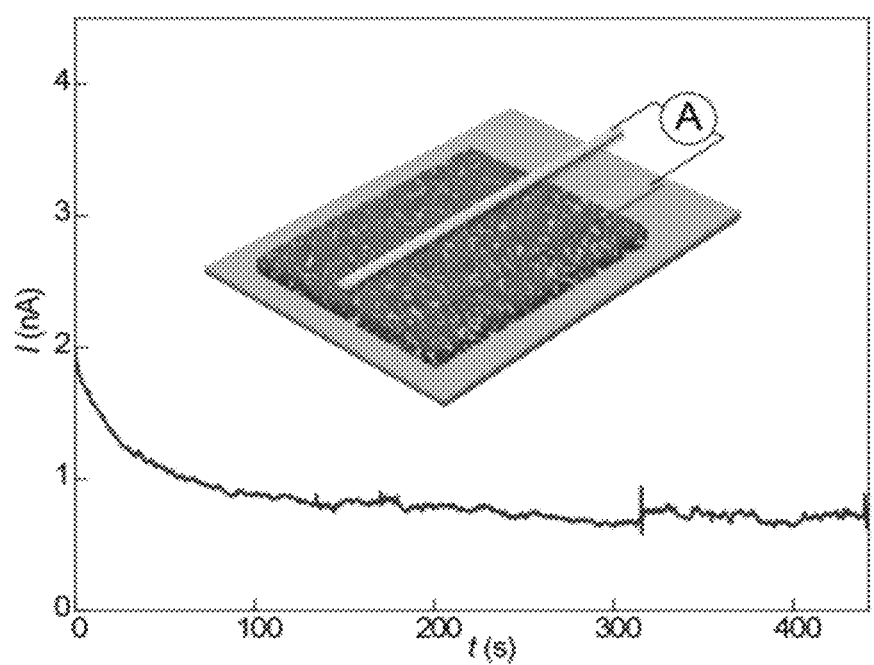

FIGS. 9A-9E are of results obtained for the air-gen effect in anodic aluminum oxide (AAO). FIG. 9A is a scanning electron microscope (SEM) images of the top surface of an AAO film. FIG. 9B is an SEM image of a cross-sectional surface of an AAO film. Scale bars, 100 nm. FIG. 9C is a photo image of a representative air-gen device made from AAO thin film (60 µm thick, diameter ~130 mm2). Scale bar, 1 cm. FIG. 9D is a graph of measured voltage output ($V_o$) from an air-gen device made from an AAO film. FIG. 9E is a graph of measured short-circuit current (I) from the same device. The measurements were performed in the ambient environment with a RH ~ 40%. The AAO film was commercially purchased from Sterlitech Corporation.

Figure 10C:
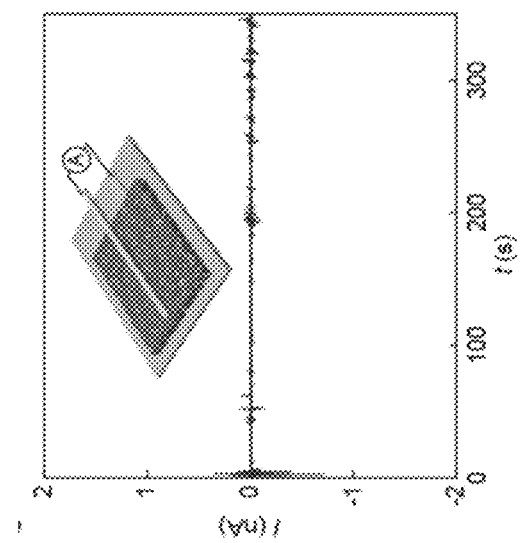
Figure 10B:
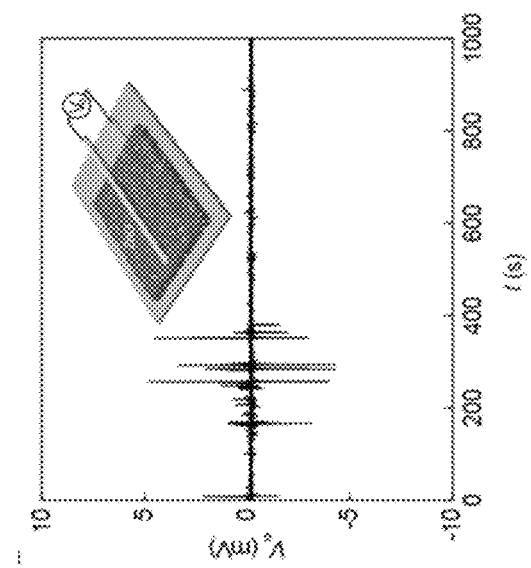
Figure 10A:
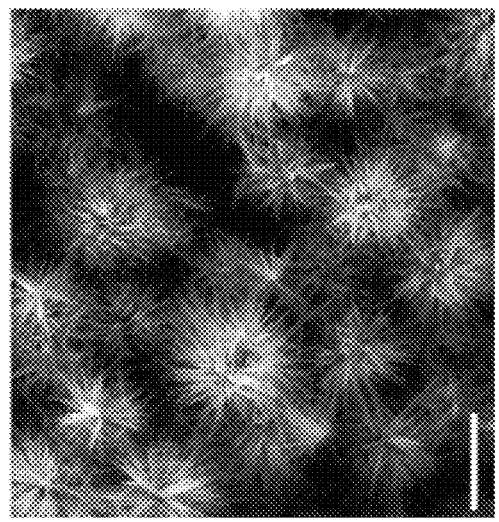

FIGS. 10A-10C are of results illustrating a negligible air-gen effect in microporous thin film made from zinc oxide (ZnO) microparticles. FIG. 10A is an SEM image of the top interface of a film assembled from ZnO microparticles. The ZnO microparticles featured a high density of bristled nanospines, greatly increased the pore sizes (e.g., >1 µm) in the assembled film. Scale bars, 5 µm. FIG. 10B is a graph of the measured voltage output ($V_o$) from an air-gen device made from a ZnO film (~10 µm thick, size ~5×5 mm2). FIG. 10C is a graph of the measured short-circuit current (I) from the same device. The measurements were performed in the ambient environment with a RH ~30%.

Figure 11:
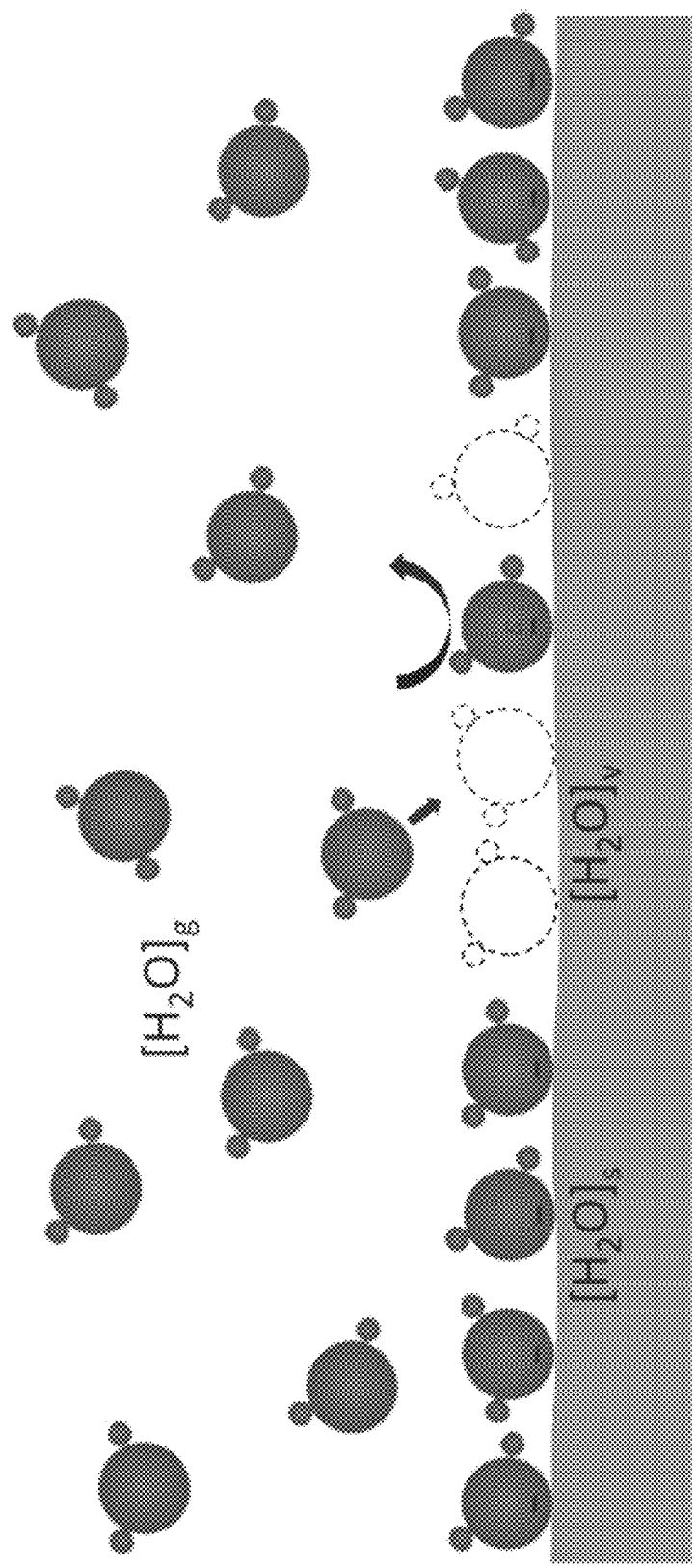

FIG. 11 is a schematic of a dynamic surface charging process. Water adsorption at the solid interface is known to be a dynamic equilibrium between the adsorption and desorption. This reversible process can be expressed as:

$$H_2O_{(g)} + H_2O_{(v)} \leftrightarrow H_2O_{(s)} \qquad (4)$$

where $H_2O_{(g)}$, $H_2O_{(v)}$, and $H_2O_{(s)}$ represent the gas-phase water, vacant surface site without water adsorption, and surface-adsorbed water, respectively. Since in an elementary reaction the reaction rate is proportional to the product of reactant concentrations, under equilibrium, we have $$k \cdot [H_2O_{(g)}] \cdot [H_2O_{(v)}] = k' \cdot [H_2O_{(s)}] \qquad (5)$$

where $[H_2O_{(g)}]$, $[H_2O_{(v)}]$, and $[H_2O_{(s)}]$ represent the concentrations of gas-phase water, vacant surface site without water adsorption, and surface-adsorbed water, respectively; and, k and k' are constants related to the recombination and dissociation processes, respectively. If, for a given solid surface, the total density of adsorption sites is a constant(s), then:

$$[H_2O_{(v)}] + [H_2O_{(s)}] = s \qquad (6)$$

Combining Eq. 5 and Eq. 6, the net adsorption $[H_2O_{(s)}]$ under the dynamic equilibrium can be expressed as:

$$[H_2O_{(s)}] = \frac{s}{1 + \frac{k'}{k \cdot [H_2O_{(v)}]}} \qquad (7)$$

which shows that the net adsorption $[H_2O_{(s)}]$ increases with the increase of gas-phase water concentration $[H_2O_{(g)}]$ or relative humidity, consistent with experimental observations. As each adsorbed net water molecule can donate an amount of (negative) charge ε to the solid surface, the total net surface charging amount can be expressed as:

$$\frac{\varepsilon \cdot s}{1 + \frac{k'}{k \cdot [H_2O_{(v)}]}} \qquad (8)$$

based on Eq. 7, which again increases with the relative humidity. Since this net charge is from a dynamic equilibrium, charge consumption (e.g., during current production) can be constantly replenished by the water exchange process.

Figure 12:
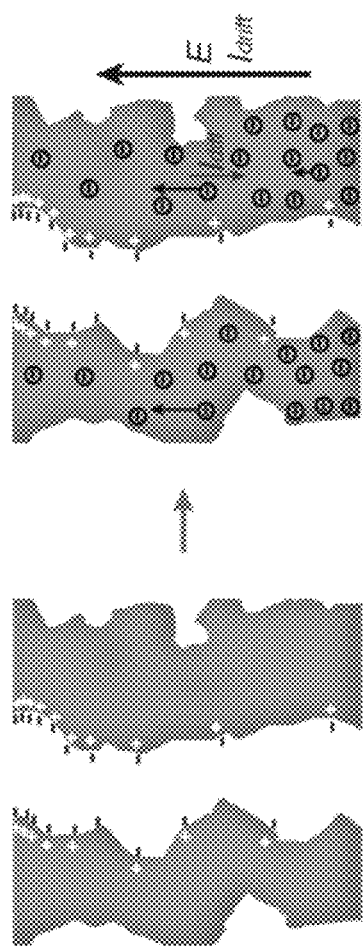

FIG. 12 is a schematic illustrating an analysis of output voltage in an air-gen device. With a gradient in surface charging, a corresponding gradient in the imaging charge ('+') is induced in the material. The surface charge tends to be less immobile based on experimental observation, leaving the imaging charge inside the material as the dominant mobile species (e.g., for diffusion). The '+' imaging charge background can result from electron depletion in the material (or hole in semiconductor), which essentially corresponds to a reverse gradient in the electron density. Considering the electron as the dominant mobile species, the density gradient leads to a diffusion current:

$$I_{diff} = -eD\frac{dn}{dx} \cdot A \qquad (9)$$

where e, D, n, A represent the charge unit, diffusion coefficient, charge density of electron, and cross-sectional area of the material. An internal electric field (E) is induced by the redistribution of electron, yielding a drift current:

$$I_{drift} = \sigma \cdot E \cdot A \qquad (10)$$

where σ represents the electronic conductivity in the material. At steady state (e.g., open circuit), no net current is generated in the material (i.e., $I_{diff} + I_{drift} =$), which yields $$\sigma \cdot E = eD\frac{dn}{dx} \qquad (11)$$

For a thin film (e.g., several µm thickness), the density gradient $$\frac{dn}{dx}$$

can be approximated as $$\frac{\Delta n}{d},$$

where Δn, and d represent the difference in electron density and distance (thickness) between the top and bottom interfaces, respectively. Since $$E = \frac{V_o}{d}$$

with $V_o$ the open-circuit voltage, Eq. 11 yields:

$$V_o = \frac{eD}{\sigma}\Delta n \qquad (12)$$

Since the difference in electron density is equivalent to the (reverse) difference in imaging charge density ($\Delta n^+$) and hence surface charge density ($\Delta n^s$), or $\Delta n - \Delta n^+ = \Delta n^s$, Eq. 12 is the same as:

$$V_o = \frac{eD}{\sigma}\Delta n^s \qquad (13)$$

Similar analysis can be applied, if the dominant mobile species is hole, to yield the same result in Eq. 13. Based on the proposed dynamic charging mechanism, the local surface charge is expected to be proportional to the exchange rate of air water molecules and hence the local water adsorption ($W_{H_2O}$) in the film (i.e., $n^s \propto W_{H_2O}\% \rightarrow \Delta n^s \propto \Delta W_{H_{2hd}\ O}\%$). As a result, the voltage output is expected to be also proportional to the water adsorption difference ($\Delta W_{H_2O}\%$) between the top and bottom interfaces:

$$V_o \propto \frac{eD}{\sigma}(\Delta W_{H2O}\%) \qquad (14)$$

Figure 13B:
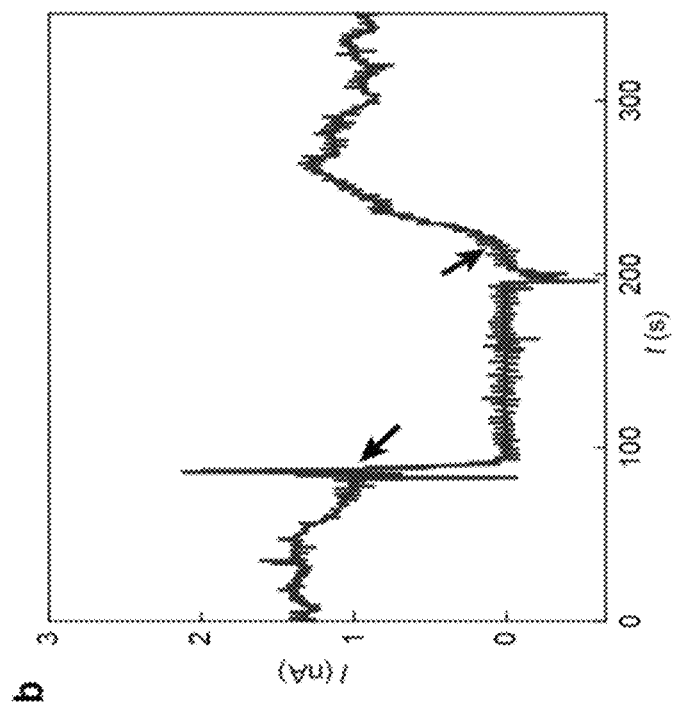
Figure 13A:
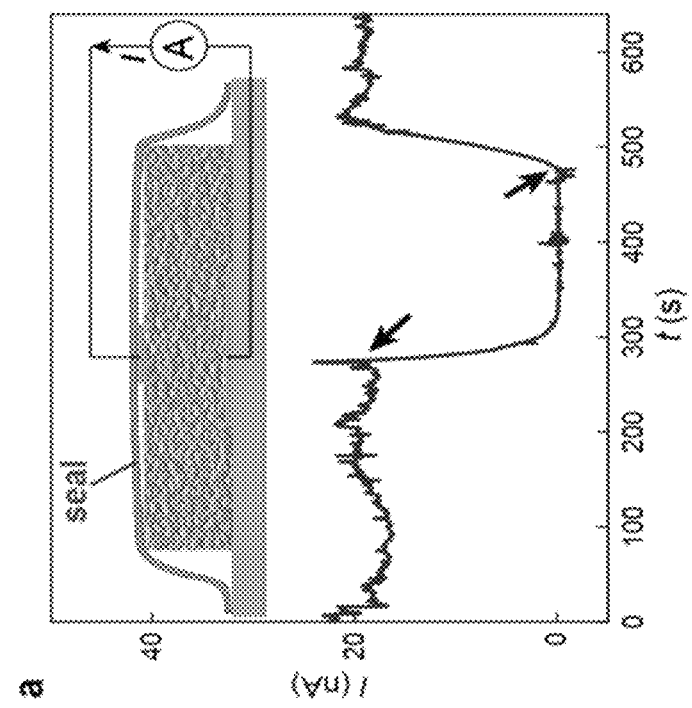

FIGS. 13A-13B are graphs illustrating reversable current outputs in air-gen devices. FIG. 13A shows that the continuous current output from an air-gen device made from cellulose nanofiber film (5×5 mm2 size; ~25 µm thick) at RH ~50% was disrupted (left arrow) when the top interface was covered with a parafilm (inset). The current began to restore the initial value (right arrow) when the seal was removed. FIG. 13B shows the same phenomenon observed in an air-gen device made from graphene oxide film (5×5 mm2 size; ~6 µm thick).

Figure 14B:
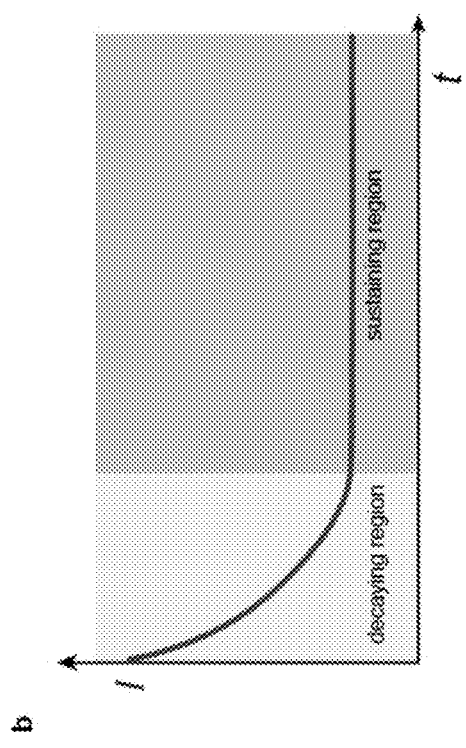
Figure 14A:
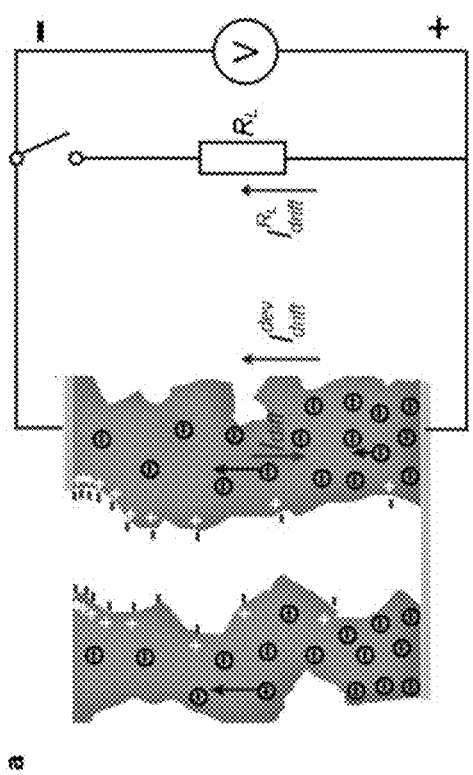

FIGS. 14A-14B illustrate current in an air-gen device. FIG. 14A is a schematic of an air-gen device connected to an external load $R_L$, assuming the switch closes at t=0. FIG. 14B is a graph of expected current I passing through $R_L$ based on analysis below. At steady state (open circuit), the drift current ($I_{drift}$) and diffusion current ($I_{diff}$) in the air-gen device cancel each other to yield a zero net current, namely:

$$I_{drift} = -I_{diff} = eD \cdot \frac{\Delta n}{d} \cdot A \qquad (15)$$

Once the air-gen device is connected to the external load $R_L$, it introduces an additional route for the drift current. Therefore, the total drift current ($I_{drift}$) is contributed from the components passing through the air-gen device ($I_{drift}^{dev}$) and external load $R_L$ ($I_{drift}^{R_L}$). At steady state, the total drift current is still balanced by the internal diffusion current ($I_{diff}$), namely:

$$I_{drift} = I_{drift}^{dev} + I_{drift}^{R_L} = -I_{diff} = eD \cdot \frac{\Delta n}{d} \cdot A \qquad (16)$$

In other words, the external load Rz takes out portion of the internal drift current (e.g., in open circuit) for use. Using Ohm's law, Eq. 16 can be rewritten as:

$$\frac{V}{R^{dev}} + \frac{V}{R_L} = eD \cdot \frac{\Delta n}{d} \cdot A \qquad (17)$$

where $R^{dev}$, $R_L$, V represent the electron resistance in the device, load resistance, and the newly established output voltage, respectively. From Eq. 17, we have:

$$V = eD \cdot \frac{\Delta n}{d} \cdot \left(\frac{R^{dev} \cdot R_L}{R^{dev} + R_L}\right) \cdot A \qquad (18)$$

With the relationship of electron conductivity $$\left(\sigma = \frac{d}{R^{dev} \cdot A}\right),$$

Eq. 18 can be reduced to:

$$V = \frac{eD}{\sigma} \cdot \Delta n \cdot \left(\frac{R_L}{R^{dev} + R_L}\right) = \left(\frac{R_L}{R^{dev} + R_L}\right)V_o \qquad (19)$$

where $V_o$ is the open-circuit voltage output (Eq. 12). This means that the re-established (i.e., at steady state) voltage output in the air-gen will reduce. As the air-gen device is considered as a capacitor, it means that an amount of charge ($\Delta Q$) proportional to the voltage reduction, as shown in Eq. 20, needs to be dissipated to bring down the voltage, yielding a fast-decaying discharging current similar to that in a capacitor (left shaded region in FIG. 14B), consistent with experimental observations.

$$\Delta V = V_o - \left(\frac{R_L}{R^{dev} + R_L}\right)V_o = \left(\frac{R^{dev}}{R^{dev} + R_L}\right)V_o \qquad (20)$$

Once the new steady state is established, the current passing through the load $I_{drift}^{R_L}$ (same as the measured current I) is:

$$I = I_{drift}^{R_L} = \frac{\left(\frac{R_L}{R^{dev} + R_L}\right)V_o}{R_L} = \frac{V_o}{R^{dev} + R_L} \qquad (21)$$

which tends to be a constant value (right shaded region in FIG. 14B), consistent with experimental observations. Here, $R^{dev}$ is the electron resistance in the material (not the typically measured resistance (R) containing ionic contribution), and hence is bigger than the measured resistance R extracted from a typical I-V sweep. This explains why the measured sustaining current is smaller than a calculated value by directly using $$\frac{V_o}{R + R_L}.$$

Figure 15:
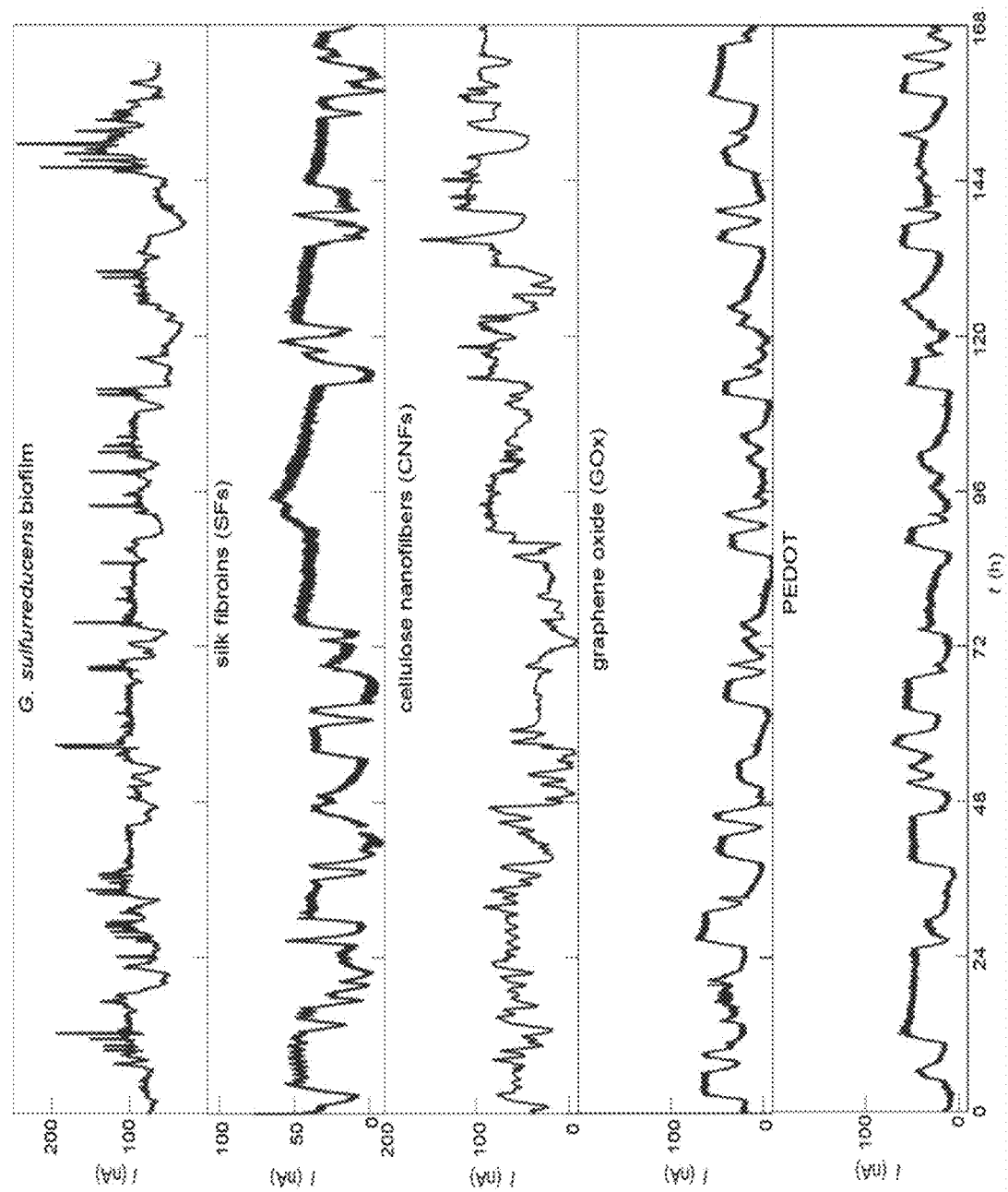

FIG. 15 is a graph showing measurements of continuous (one-week) current production from air-gen devices made from *G. sulfurreducens* biofilm, silk fibroins, cellulose nanofibers, graphene oxides, and PEDOT nanowires, respectively (from top to bottom), under a controlled RH of 80%.

DETAILED DESCRIPTION

A description of example embodiments follows.

Air humidity, or ambient moisture (e.g., comprising water vapor), is a vast, sustainable reservoir of energy that, unlike solar and wind, can be continuously available. However, previously-described technologies for harvesting energy from the moisture in air are either not continuous or can require unique material synthesis or processing (e.g., protein nanowires), which can stymie the scalability and broad deployment of such technologies.

A general strategy for harvesting energy from moisture in air is to induce an imbalance in charge distribution at a water-solid interface of materials to drive charge flow for electricity. Previous approaches mainly fall into two categories. The first category involves creating a directional water flow that carries along interfacial charge flow for current. In such prior approaches, a humidity gradient was applied to drive water flow, which yielded only a short burst of current if the applied humidity gradient was not sustained (e.g., as with breathing), or a specific location (e.g., at a water surface) was required for maintaining the gradient. Either case falls short of scalability in an ambient environment.

The second category involves introducing heterogenous surface functionalization in materials, which results in differentiated interfacial charge distribution with the same humidity. Such methods thus generated current in the ambient environment, although energy density or current continuity was low. Surface functionalization can increase costs in material processing and limit long-term stability. Other devices initially used dehydrated materials to adsorb air water, during which the temporarily induced adsorption gradient could drive electric output. But, once an adsorption saturation was reached, the gradient disappeared and the electric output ceased. These devices offered a one-time current output no longer than 48 hours.

Recently, it was discovered that a homogenous thin film made from (non-dehydrated) protein nanowires harvested from microorganism *Geobacter sulfurreducens* can generate electricity from the air humidity with improved energy density and long-term stability, as described in Liu, X. et al. Power production from ambient humidity using protein nanowires. *Nature* 578, 550-554 (2020), the entire teachings of which are incorporated herein by reference. The sustainability was further demonstrated by integrating the devices into neuromorphic interfaces for self-sustainability in the ambient environment, as described in Fu, T. et al. Self-sustained green neuromorphic interfaces. *Nat. Commun.* 12, 3351 (2021). A distinct mechanism was revealed, in which a spontaneous water adsorption gradient was found to build up across the film thickness and induce differentiated charge interaction for current. The adsorption gradient was maintained over the 10-month period the devices were tested, showing a sustainable mechanism. This is inherently different from energy releasing in previous devices, in which the temporary adsorption gradient disappeared when the initially dehydrated materials reached full adsorption and the energy output stopped. To differentiate the protein nanowire device from other devices in the broad category of humidity generators, the device is termed as an 'air generator' (or 'air-gen') to highlight its feature of sustainability in an ambient air environment.

A potential limitation of scaling up the air-gen is the cost associated with the biological production of the protein nanowires. Although strategy for improved production of the protein nanowires with *Escherichia coli* has been described, the required mass cultivation of the microbe and harvesting of the nanowires is likely to be still limited.

Further examples of systems and methods providing for energy harvesting and electric power generation from atmospheric moisture are described in U.S. Pub. No. 2021/0344286, titled "Electric Power Generation from Ambient Humidity Using Protein Nanowires," the entire teachings of which are incorporated herein by reference. Improvements to air-gen devices, with various substitutes for protein nanowires, are provided.

Devices made from a wide range of inorganic, organic, and biological materials and capable of continuous energy harvesting from atmospheric moisture are provided. The devices described can provide for ambient "air chargers" for portable or wearable electronics. The devices can also serve as electric generators for scalable clean power production.

The provided devices can advantageously be more easily manufacturable than those described in U.S. Pub. No. 2021/0344286. The described devices can also provide for adaptability to various environments and improved performance within those environments. For example, a device's nanoporous material(s) can be selected to account for and prioritize low toxicity (e.g., as would be desirable for wearable devices), stability (e.g., as would be desirable for particular climate conditions), and/or output (e.g., as would be desirable for higher-energy applications).

A "nonbiological" material, as used herein, means a material that is not derived or harvested from a living organism, or that is not ordinarily produced by a living organism. Nonbiological materials can be organic or inorganic.

Examples of suitable organic and inorganic nonbiological materials for use in a nanoporous material of an adsorption layer include poly(3,4-ethylenedioxythiophene) (PEDOT), poly(3-hexylthiophene) (P3HT), polyvinyl alcohol (PVA), polylactic acid (PLA), poly vinyl phenol (PVP), polyacrylonitrile (PAN), metal organic frameworks (MOFs), graphene oxide (GOx), anodic aluminum oxide (AAO), carbon, silicon, and zeolites.

The material can be in a form that provides or produces a nanoporous structure. For example, carbon nanoparticles and/or carbon nanowires can be used in an adsorption layer. Other examples include PEDOT nanowires, graphene oxide flakes, and silicon nanowires.

A "nonprotein" material, as used herein, means a material that does not comprise or is not predominantly composed of amino acid polymers comprised of canonical amino acids. Nonprotein materials can consist of or include biological macromolecules other than proteins, such as carbohydrates, lipids, and nucleic acids.

Examples of suitable nonprotein biological materials for use in a nanoporous material of an adsorption layer include cellulose (e.g., cellulose nanofibers (CNF)), collagen, RNA/DNA, chitosan, agarose, pectin, starch, fucoidan.

Additional examples of materials that can be used in an adsorption/interaction layer of an energy devices are provided below.

Biomaterials/biomolecules. Any biomaterials/biomolecules, when naturally existent or assembled into films, which have nanometer (1-500 nm) and sub-nanometer (0.1-1 nm) scale pores/slits/orifices in the film, including (but not limited to): 1. Wild-type protein nanowires (G. sulfurreducens; pili, OmcS nanowires; Syntrophus pili; Archaellum; other protein nanowires); 2. Edited protein nanowires (natural amino acid groups substituted/inserted/ deleted with other amino acid groups/ligands); 3. Synthetic protein nanowires/filaments/nanofibers/nanomaterials (by peptide self-assembly; e.g., amyloid nanowires). 4. Biofilms (bacteria with nanowires). 5. Biofilaments (collagen, silk; or by electrospinning); 6. Assembled biomaterials (e.g., RNA/ DNA biomolecular assemblies; cellulose). 7. Combinations of the above materials.

Nonbiological materials. Nonbiological materials with hygroscopic functional groups (e.g., including but not limited to carboxyl, amine, hydroxyl groups), when naturally existent of assembled into films, which have nanometer and sub-nanometer scale pores/slits/orifices in the film, including (but not limited to): 1. Functionalized inorganic nanowires/nanotubes (e.g., functionalized Si nanowires, CNT with DNA); 2. Inorganic nanoparticles (e.g., carbon, aluminum oxide, silica); 3. Nanoflakes/2D layered materials (e.g., graphene/graphene oxides, transition metal dichalcogenides); 4. Nanoporous inorganic materials (zeolites; anodic aluminum oxide); 5. Nanoporous organic materials (e.g., metal organic frame works (MOFs)); 6. Organic nanowires/nanofibers/nanofilaments/nanoflakes; 7. Combinations of the above materials.

Heterogeneous materials. Heterogeneous materials based on combinations of the above biological- and nonbiological- materials: Combinations/composites made from the mixing of biomaterials and nonbiological materials (i.e., combinations of materials from both of the above categories), which have nanometer and sub-nanometer scale pores/slits/orifices in the film.

Combinations/composites made from the mixing of biomaterials and nonbiological materials (the combinations of above categories), which have nanometer and sub-nanometer scale pores/slits/orifices in the film.

Figure 1A:
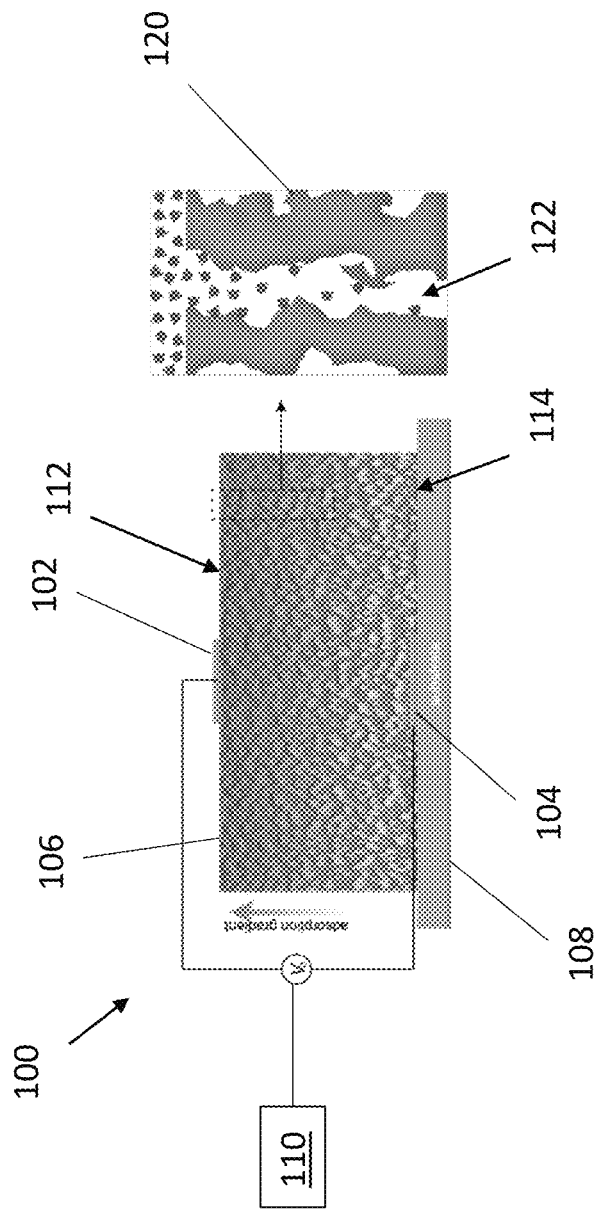
FIG. 1A is a schematic of an example device for harvesting energy that includes a nanoporous thin film as an adsorption layer sandwiched between a pair of inert (e.g., Au) electrodes. The top electrode has a relatively small size to permit air exposure. A stable water adsorption gradient (grey trend) is induced across the film thickness. A confinement in a nanoscale channel can induce a concentration gradient in air water molecules.
Figure 1C:
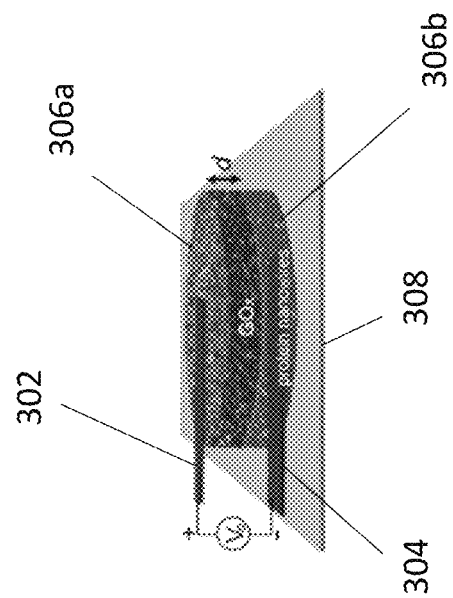
FIG. 1C is a schematic of another example configuration of a device for harvesting energy that includes a heterogeneous adsorption layer in a stacked orientation and electrodes disposed on opposing surfaces.
Figure 1B:
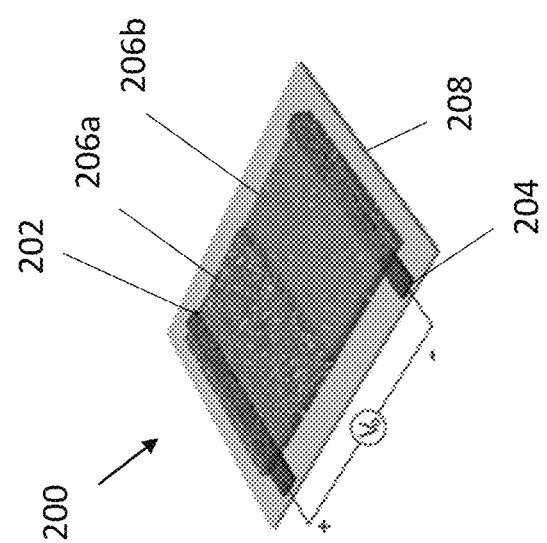
FIG. 1B is a schematic of a configuration of a device for harvesting energy that includes a heterogeneous adsorption layer and electrodes disposed on a same surface, at opposing ends of the adsorption layer.

An example device is shown in FIG. 1A. The energy harvesting device 100 includes an adsorption layer 106, which can optionally be disposed on a substrate 108. The adsorption layer 106 comprises a nanoporous material 120, which can provide for nanoscale structures that define pores 122. The device 100 further includes at least two electrodes 102, 104. As illustrated, the electrodes 102, 104 are disposed on opposing surfaces 112, 114 of the adsorption layer 106. The electrodes can alternatively, or in addition, be disposed at opposing ends of the adsorption layer, including on a same surface of the layer (e.g., as shown in FIG. 1B). The electrodes 102, 104 are in operative arrangement with the adsorption layer such that a voltage differential is generated on exposure of the adsorption layer to ambient moisture. Optionally, the device can include a storage element 110, or energy store (e.g., capacitor, battery, etc.), configured to store energy from current supplied by the adsorption layer and the electrodes.

The nanoporous material 120 can be or include a nonbiological material, a nonprotein material, or a combination thereof. For example, the nonbiological material can be an organic material (e.g., poly(3,4-ethylenedioxythiophene) (PEDOT), poly(3-hexylthiophene) (P3HT), polyvinyl alcohol (PVA), Polylactic acid (PLA), poly vinyl phenol (PVP), Polyacrylonitrile (PAN), metal organic frameworks (MOFs)) or an inorganic material (e.g., graphene oxide (GOx), anodic aluminum oxide (AAO), carbon nanoparticles, silicon nanowires, carbon nanotubes, zeolites.).

Examples of suitable nonprotein nanoporous material include cellulose, collagen, RNA/DNA, chitosan, agarose, pectin, starch, fucoidan.

As illustrated in FIG. 1A, the nanoporous material can be configured to generate an adsorption gradient of $H_2O$ within the device on exposure to humidity. The nanoscale structures defined by the nanoporous material can define pores 122 of, for example, less than about 500 nm, or less than about 200 nm. A thickness of the adsorption layer can be in range of about 0.5 μm to about 500 μm. As further illustrated in FIG. 1A, the pores 122 (or at least a subset of the pores defined within the adsorption layer) can extend through the thickness of the adsorption layer.

An adsorption layer of the device can be a heterogenous adsorption layer that includes two more nanoporous materials (e.g., biological- and/or nonbiological-materials). As illustrated in FIG. 1B, a heterogenous device 200 includes an adsorption layer 206a, 206b of a first material (206a) and a second material (206b) in a substantially planar configuration and disposed atop a substrate 208. Electrodes 202, 204 are disposed between the adsorption layer and the substrate at opposing ends of the adsorption layer, such that one electrode 202 is in contact with the first material (206a) and the other electrode 204 is in contact with the second material (206b).

Other configurations of one or more thin films to provide for an adsorption layer are possible. In a further example, shown in FIG. 1C, a heterogenous device 300 includes an adsorption layer 306a, 306b of a first material (306a) and a second material (306b) disposed in a vertically-stacked configuration atop a substrate 308. The electrodes 302, 304 are disposed at opposing surfaces, but may, alternatively or in addition, be disposed at opposing ends of the device. While FIG. 1C indicates that the upper layer is a nonbiological material (e.g., GOx) and the lower layer is a biological material (e.g., biofilm of protein nanowires), it should be understood that any combination of biological and/or nonbiological materials can be included in the devices of FIGS. 1A-1C to form homogenous or heterogenous adsorption layers for an energy harvesting device. The devices of FIGS. 1B and 1C can further include one or more energy storage devices, such as a battery or capacitor, as illustrated in FIG. 1A.

Examples of suitable biological materials include protein nanowires, such as those harvested from *G. sulfurreducens*. Examples of suitable protein nanowires for use in the provided devices are further described in U.S. Pub. No. 2021/0344286, the entire teachings of which are incorporated herein by reference.

The nanoporous material can include at its surface at least one surface group capable of interacting with water molecules. For example, the surface group can be a hydroxyl group, a carbonyl group, a carboxyl group, and/or an amino group. The surface group can be a hydroscopic functional group. See, e.g., FIGS. 8A-8C.

A high density of nanopores coupled with a hydrophilic interaction can induce decreased vapor pressure within the nanowire material. A resultant lower vapor pressure deeper in the film can generate and maintain an adsorption gradient between the outer and inner interfaces. The reason for this is that water adsorption at a solid surface is a dynamic equilibrium between adsorption and desorption, and the adsorption decreases with the decrease in the molecular concentration of air water or the vapor pressure.

A confinement effect in gas can provide for further understanding. If a nanopore size is less than the mean free path of air water molecule (~100 nm in the ambient environment), gas-solid interaction can dominate over gas-gas interaction, leading to a thermodynamic equilibrium deviated from free gas. Previous studies have shown that gas confined in nanoscale has higher pressure than that in free space at the same density and temperature. Thus, the gas density in a confined nanospace can be lower to maintain the equilibrium (e.g., same pressure and temperature) with the connected open environment. In an alternative perspective, the increased chemical potential in gas (e.g., from surface interaction) can be balanced by its density reduction under equilibrium. The gradual increase in confinement (e.g., in the vertical direction) from outer to inner interface can lead to a reverse density gradient in air water (see FIG. 1). In other words, nanowires near the top surface can be collided by air water molecules more often than inner nanowires. As adsorption increases with an increase in collision rate, outer nanowires can adsorb more water than inner ones to generate an adsorption gradient. Importantly, this adsorption gradient is sustained over time because it results from a continuous dynamic equilibrium.

These mechanistic considerations can provide for porous materials, other than or in addition to protein nanowires, as a functional material in an air-gen device. Such materials can have 1) a pore size comparable to or less than the mean free path of air water molecule, and 2) a surface that interacts with water molecules.

As further described in the Experimentation section, a generic air-gen effect across broad range of inorganic, organic and biological materials was achieved. The generic effect is attributed to differentiated dynamic water and associated charge exchange in nanoporous materials, which manifests to the existence of a self-maintained water adsorption gradient. A pore size below the mean free path of air water (~100 nm) can yield a prominent effect. Surface functional groups can be important in determining the exchange dynamics, with hygroscopic groups generally facilitating the effect. Together, smaller pores and higher density of hygroscopic groups can yield higher energy density, as demonstrated among materials studied. However, excessive water adsorption may lead to surface wetting, which can flatten out the gradient essential to the effect. Therefore, superhydrophilic materials may not be the best candidates. Biomaterials are usually made from amphiphilic biomolecules, which indicate that an amphiphilic surface can provide for an enhanced effect. Metal organic frameworks (MOFs) can also provide for a class of materials for air-gen applications due to their well-defined nanoporosity and ability to incorporate hygroscopic functional groups for water adsorption. Scalable, high-quality MOF thin films featuring low-density grain boundaries (e.g., to effectively reduce uncontrolled extrinsic pores at the boundaries) can provide for suitable structural properties. Although the molecular detail of surface charging is not fully known and can be different in different materials, the proposed 'leaky capacitor' model offers good understanding in the energy generation behaviors, as well as providing useful guidance for developing and optimizing devices.

The sustainable air-gen technology can provide for several advantages. Although a single sheet of air-gen has a lower energy output (e.g., up to μW/cm2 level) than some existing harvesters (Table 1), such sheets can be vertically stacked to improve power without taking up an additional footprint due to the diffusive nature of humidity. Preliminary studies showed that these air-gen devices placed in an airgap of commeasurable size to device thickness (e.g., 20 μm) could retain electric output. This leads to an ideally estimated energy density >1 kW/m$^3$ in vertically integrated air-gen (the value is still subject to available energy flow in the environment). Since air humidity is ubiquitous and continuously available, an air-gen device can be deployed almost anywhere for continuous energy harvesting, transcending the inherent intermittence in existing harvesters restricted to time or location (see Table 1). Air-gen devices can further provide for flexibility in material choice (e.g., renewable production) and engineered form factor (e.g., merge with environment), making it a possible 'greener' energy technology for tomorrow.

TABLE 1

Comparison of some metrices in various harvesters.

| Harvester/source | Energy density (W/m$^2$) | Sustainability | 3D scalability |
|---|---|---|---|
| Ambient radio | <0.01 | Contingent on the availability of radio source | No |
| Thermoelectric | ~0.6 | Contingent on the availability of thermal gradient | No |
| Piezoelectric | 0.01-0.1 (peak value) | Contingent on the availability of mechanic vibration | Limited |
| Triboelectric | 1-500 (peak value) | Contingent on the availability of mechanic vibration | Limited |
| Wind/air flow | ~10 | Contingent on geographic location and weather | Limited |
| Solar (office) | ~1 | Contingent on office working hour | No |
| Solar (sunlight) | ~1000 (peak value) | Contingent on geographic location and weather | No |
| Hydrovoltaic (streaming) | 0.0001-0.06 | Contingent on availability of liquid water source | No |
| Hydrovoltaic (gradual adsorption) | ~0.05 | No (one-time release) | Not practical given the non-sustainability |
| Hydrovoltaic (instant adsorption) | 0.0001-0.08 (peak value) | Only works with alternating humidity (e.g., breath) | Not practical given the non-sustainability |
| Air-gen (air humidity) | ~0.0001-0.05 | Continuous & ubiquitous | Yes |

Additional examples of energy harvesting devices and methods of harvesting energy from moisture in ambient air are described throughout the following Exemplification.

EXEMPLIFICATION

Example 1. Observation of Air-Gen Effect with Different Materials

Figure 2:
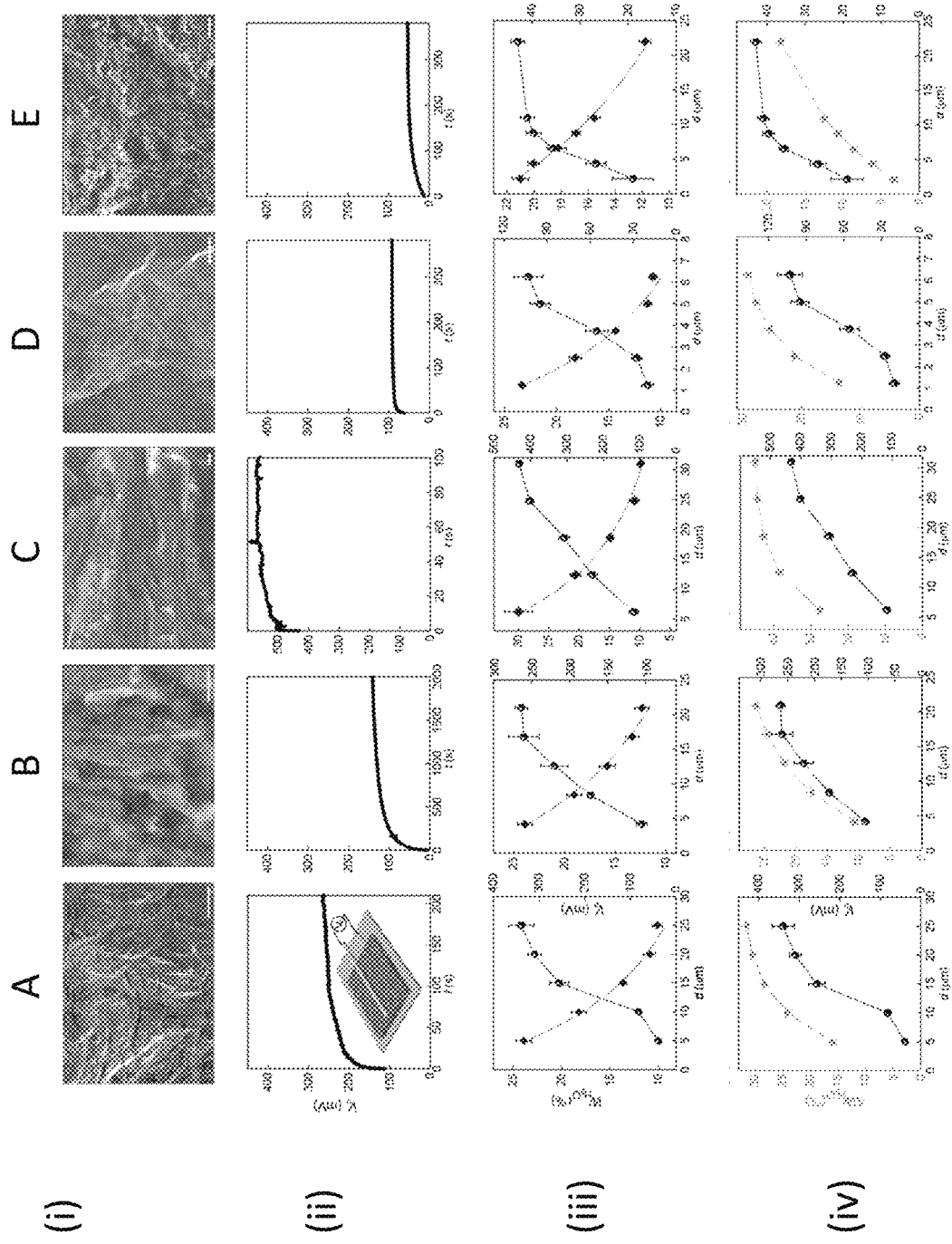
FIG. 2 is a chart illustrating air-gen effects in different materials and providing a comparison thereof. Columns A-E illustrate results obtained from, respectively, (A) a cellulose nanofiber (CNF) film, (B) a silk fibroin (SF) film, (C) a *G. sulfurreducens* biofilm, (D) a graphene oxide (GOx) film, and (E) a poly(3,4-ethylenedioxythiophene) nanowire (PEDOT) film. Row (i) illustrates scanning electron microscope (SEM) images of each thin film, with scale bars of 1 µm. Row (ii) illustrates representative voltage outputs ($V_o$) measured from the devices, with thicknesses as follows: CNF film (25 μm thick), SF film (21 μm thick), *G. sulfurreducens* biofilm (31 μm thick), GOx film (6 μm thick), and PEDOT film (11 μm thick). All the devices used the same structure (inset) and same size (0.5×0.5 cm²). Row (iii) illustrates thickness (d)-dependent water adsorption $W_{H2O}\%$ (grey small-dash curve) and voltage output $V_o$ (black thick-dash curve) for each film. For fitting (dashed grey line), the local adsorption at depth d is approximated by $$f(d) = A \cdot e^{-d/\lambda} \quad (1)$$

Cellulose nanofibers (CNF) which have a distinctly different composition than protein nanowires but share some similar structural properties such as nanometer-scale diameter and hygroscopic surface, were chosen as a starting material. Assembled thin films had nanopores consistent with previous reports (FIG. 2, A column). Electrical measurement confirmed a spontaneous voltage output ($V_o$) ~260 mV (FIG. 2, A(ii)) from a fabricated thin film device in the ambient environment, offering initial evidence to the generic mechanistic picture (FIGS. 1A-1C).

Analysis of the water adsorption in the CNF films of different thicknesses revealed a consistent trend of decreasing weight-percent water adsorption ($W_{H2O}$%) with increasing film thickness (FIG. 2, A(iii), grey curve). $W_{H2O}$% reduced from ~24% for thin films (~5 μm thick) to ~10% for thicker ones (≥20 μm thick). This pattern of thickness-dependent water adsorption is consistent with the expectation of an adsorption gradient, with higher adsorption at outer interface gradually lowering to ~0% at inner interface (e.g., >20 μm depth) to yield different average adsorption ($W_{H2O}$%) values for different film thicknesses. The measured voltage output $V_o$ gradually increased from ~40 mV to ~340 mV when the film thickness in the devices increased from 5 μm to 25 μm (FIG. 2, A(iii), black curve). For better comparison, the adsorption difference ($\Delta W_{H2O}$%) between the top and bottom interfaces in CNF films was extracted and plotted together with $V_o$ (FIG. 2, A(iv)), which revealed a close correlation between them. This correlation is consistent with the prediction based on a diffusion model, in which the output voltage is proportional to the ionization difference that is correlated to adsorption difference.

A device made with nanoporous silk fibroin (SF) film (FIG. 2, B column) produced stable voltage output ~150 mV in the ambient environment (FIG. 2, B(ii)). A similar trend of decreasing $W_{H2O}$% was observed, lowering from ~24% in thin films (~5 μm thick) to ~12% for thicker (>20 μm) ones (FIG. 2, B(iii), grey curve). The voltage output ($V_o$) increased from ~100 mV to 260 mV (FIG. 2, B(iii), black curve). Extracted $\Delta W_{H2O}$% showed close correlation with $V_o$ (FIG. 2, B(iv)). Similarly, a device made from biofilm assembled from microorganism *Geobacter suffurendences* (FIG. 2, C column) generated spontaneous $V_o$~550 mV (FIG. 2 C(ii)). Similar trends of thickness-dependent $W_{H2O}$% (FIG. 2, C(iii), blue curve), $V_o$ (FIG. 2, C(iii), black curve), and $V_o$-$\Delta W_{H2O}$% correlation (FIG. 2, C(iv)) were observed.

The study was extended to nonbiological materials, starting with thin films made from graphene oxides (GOx) flakes (FIG. 2, C column), which were commonly employed for humidity-based electricity harvesting. However, previous devices required either an applied humidity gradient or an engineering surface gradient in the GOx layers to generate electric output. It was found that a spontaneous voltage output $V_o$~ 100 mV was generated in device made from a homogenous GOx film in the ambient environment (FIG. 2, D(ii)). Thickness-dependent $W_{H2O}$% was consistently observed in GOx films, lowering from ~23% to ~11% when the film thickness increased from 1 to 6 μm (FIG. 2, D(iii), grey curve). Previous studies used much larger thickness films (e.g., >100 μm), thus likely to miss out this ambient effect. Correspondingly, $V_o$ increased from ~20 mV to ~100 mV with the increase in film thickness (FIG. 2, D(iii), black curve), also showing close correlation with the extracted $\Delta W_{H2O}$% (FIG. 2, D(iv),). A device made with thin film assembled from poly(3,4-ethylenedioxythiophene) (PEDOT) nanowires (FIG. 2, E column) also showed spontaneous $V_o$~55 mV in the ambient environment (FIG. 2, E(ii)). Consistent thickness-dependent trends in $W_{H2O}$% (FIG. 2, E(iii), grey curve), $V_o$ (black curve), and $V_o$-$\Delta W_{H2O}$% relationship were observed (FIG. 2, E(iv)).

The existence of the adsorption gradient was further confirmed by the direct observation of depth-dependent adsorption in the nanoporous materials. The resistance of the material layers showed monolithic increase with the increase of the buried depth (FIG. 3, row A). Since film resistance was inversely related to moisture adsorption (FIG. 3, row B), these results show that moisture adsorption decreases with the increase of depth to provide direct evidence to the existence of the adsorption gradient. Importantly, the decreasing adsorption in the layer was observed by gradually increasing the upper layer thickness, supporting that the adsorption gradient results from a dynamic equilibrium (FIG. 1) (e.g., it is unlikely to have a reverse desorption in a gradual net adsorption process). This dynamic origin suggests that the gradient can be sustained over time, which is inherently different from the temporary gradient observed during a gradual net adsorption process in other devices.

Both the top and bottom electrodes in all above devices were made from electrodes coated with inert Au. To avoid possible contamination from other metal elements, pure Au electrodes were made by directly depositing a 50-nm Au layer (i.e., without an adhesion layer of other metal) on substrates. Devices fabricated from these pairs of pure Au electrodes yielded consistent electric outputs. These results have demonstrated that a diversity of materials can be used to make air-gen devices to generate electricity in the ambient environment, which is not associated with electrochemical process in the electrode and consistent with the generic picture proposed (FIG. 1A).

Example 2. Comparison of Material Properties

Analyses of the results revealed several distinct trends (FIG. 4). The saturation thickness ($d_s$), defined as the depth at which the adsorption reduces to 10% of the surface adsorption, tracked with the pore size of materials (FIG. 4, top). Larger pore sizes yielded larger $d_s$. This is consistent with the expectation that a reduced lateral confinement requires a compensation in depth to produce a confinement effect. For this reason, we expect the adsorption gradient ($\nabla_{H2O}$), defined as $\Delta W_{H2O}$% per unit thickness, to trend in the opposite direction as the pore size, consistent with observation (FIG. 4, bottom, black curve).

Surface functionality can play key role in water-solid interaction and hence substantially affect the performance. The nanoporous materials used in air-gen devices generally contained hygroscopic surface functional groups and showed hydrophilic surface property (FIG. 7), which is expected for the facilitation of surface interaction with air water. The output-voltage 'density' or electric field (E), which is closely related to energy density, showed a deviation from the trend of $\nabla_{H2O}$ (FIG. 4, bottom, grey curve). For example, protein nanowire films had a slightly lower $\nabla_{H2O}$ but a much higher E (e.g., >4 times) than values in GOx films. This is because E results from a charge gradient that is also dependent on surface functionality. A higher density of hygroscopic groups is expected to enhance the ionization/charge gradient with the same $\nabla_{H2O}$. Protein nanowires have higher density of surface groups, thus larger E. Overall, biomaterials tended to have larger E/$\nabla_{H2O}$ ratio (FIG. 4, inset), hence energy efficiency, than that in nonbiological materials, consistent with expectation that they usually have more hygroscopic groups. Improving the surface hydrophilicity in the same CNFs material by surface functionalization led to improved adsorption gradient and electric outputs (FIGS. 8A-8C), consistent with above analysis. Protein nanowire films had the largest E and hence energy density, which can be attributed to the small pore sizes in the films and a high density of surface hygroscopic groups on individual nanowire surfaces. Estimated conversion efficiency from measured outputs showed a trend consistent to the trend of the E/$\nabla_{H2O}$ ratio, further shown in Table 2.

TABLE 2

Estimate of the conversion efficiency (n) in air-gens made from different materials (at RH of 50%).

| Material | Open-circuit voltage $V_0$ (V) | Shor-circuit current $I_s$ (nA) | Power density* ($\mu W/cm^2$) | η (%) |
|---|---|---|---|---|
| Protein nanowires |  |  | 5.0 | 3 |
| CNF | 0.25 | 110 | 0.2 | 0.25 |
| G. sulfurreducens biofilm | 0.55 | 50 | 0.2 | 0.1 |
| SF | 0.14 | 45 | 0.05 | 0.1 |
| PEDOT nanowire | 0.04 | 30 | 0.01 | 0.07 |
| GOx | 0.11 | 10 | 0.01 | 0.02 |

The conversion efficiency n is defined as the ratio between the actual optimal energy output and maximal theoretical energy input in the air-gen device. The optimal electric energy output (areal density) in the device can be approximated as $P_o=(V_o \cdot I_s/4)/A$, where $V_o$, $I_s$, and A are the open-circuit voltage, short-circuit current, and size of the device. Here A is considered as the effective area for current collection (i.e., electrode size ~0.7×5 mm2).

The maximal theoretical energy input from ambient humidity (areal density) can be approximated as $P_i=\Delta E \times n$. Here, $\Delta E$ is the average energy transfer when a charge is transferred between the water molecule and the solid interface; n is the water-molecule exchange rate, which was measured to be ~3.9×10$^{15}$ cm$^{-2}$·s$^{-1}$ in our previous study (at RH~50%). In the process of charging a capacitor, each added electron contributes an average energy of e·V/2 (where V is the final voltage in the capacitor). As the air-gen device can be considered as a leaky capacitor, this $\Delta E$ can be approximated as e·$V_o$/2 (where $V_o$ is the final open-circuit voltage). So the conversion efficiency can be estimated by:

$$\eta = \frac{P_o}{P_i} = \frac{V_o \cdot I_s/4A}{(e \cdot V_o/2) \cdot n} = \frac{I_s}{2e \cdot n \cdot A} \qquad (22)$$

As a further test of the generality and mechanistic trend, nanoporous anodic aluminum oxide (AAO) film having relatively large pore size (e.g., ~ 200 nm) was used to make device (FIGS. 9A-9E). The pore size is around the expected limit for observing air-gen effect, for it is comparable to the mean free path of air water molecules and a threshold size for observable vapor pressure lowering. The device indeed generated a spontaneous $V_o$~ 45 mV expected from the generic effect. The E(~7.5 V/cm), lowest among all test materials, was also anticipated from the combined properties of large pore sizes and a low density of surface groups. Porous film made from bristled microparticles had pore sizes above micrometer scale and thus produced negligible air-gen effect (FIGS. 10A-10C).

Example 3. Current Generation Mechanism

Since porous materials assume certain level of conduction in the ambient environment, the sustained voltage output indicates that there exists a continuous charging mechanism to balance the leakage. It is generally acknowledged that the details of surface charging are largely unknown. Previous assumption of water-assisted deprotonation in surface functional groups has provided reasonable description in some materials, although questions remain regarding how the current loop is closed (e.g., internal proton current converts to external electron current). Another attempt introduced the concept of imaging electron in material to circumvent this challenge.

A central question that has not been addressed is whether water is consumed during the process. Experiments were designed to address this question, as it is related to air-gen mechanism. In one set of experiments, the weight of an air-gen device was real-time monitored during the current production. The air-gen device maintained the same weight during the 110-h continuous current production. In another set of experiments, an air-gen device was placed in an enclosed chamber for current generation, with the RH constantly monitored. During a 58-h continuous current production, the total charge transfer involved, if to be provided by water consumption or net adsorption, would have induced measurable relative humidity (RH) change (e.g., >4%) in the chamber. However, the measured RH maintained a stable level. These results suggest that the current production in air-gen does not involve net water adsorption or decomposition (e.g., redox). This finding supports that 1) a dynamic water exchange (without net adsorption) and 2) an associated electrostatic/ionic charge transfer are responsible for the current production. This conclusion is consistent with the generic effect observed in various materials with which water is unlikely to react.

Therefore, the surface charging process can be viewed as a 'contact electrification' between the water molecule and a solid interface. This consideration is consistent with observation that surface charging by air humidity was observed across a wide range of materials including other dielectrics and metals, with a negative charge donation dominantly observed. Different charge species (e.g., ions, electron, hole) may involve for the 'electrification' with different material surfaces, with the details warranting further study.

Based on above considerations, a mechanistic model for further understanding in the air-gen effect is proposed. The model is based on several key rationales. First, we assume that a water molecule/cluster will donate portion of negative charge to a solid surface (FIG. 5A). The detail of the donated charge type and process is left out for reasons discussed above, which nonetheless does not affect the analysis and prediction. Importantly, this net charge donation is not static but a dynamic equilibrium resulting from the dynamic water exchange (i.e., adsorption and desorption) at the surface. A higher ambient humidity can push the dynamic equilibrium toward higher water adsorption and charge donation (FIG. 11), which is supported by experimental observation that a higher humidity led to higher surface charging. It thus leads to the expectation that the outer layer of material, with higher water adsorption, will receive more (negative) surface charge than the inner layer (FIG. 5B). This induced charge imbalance can be also understood from the perspective of 'contact electrification' between water molecule and solid interface, in which the outer layer is subject to more collision from water molecules (FIG. 1A), and thus, more charging effect than the inner layer. This is also consistent with the observation that the top electrodes of devices always assumed a negative voltage sign (FIG. 2, Row (ii)).

Second, the donated surface charge can further induce imaging charge in the material like that in a capacitor (FIG. 5A). The donated surface charge can be less mobile based on studies showing that a high humidity did not facilitate its dissipation, thus leaving the imaging charge in material to be the main type for diffusion. A diffusion model of the imaging charge can be established to account for the voltage output $V_o$ and its proportionality to the adsorption difference $\Delta W_{H2O}\%$ between the top and bottom film interfaces (FIG.

12). This is consistent with experimental observations that 1) increasing film thickness led to expected increasing $\Delta W_{H2O}\%$ (at fixed humidity) and thus increasing $V_o$ in all the devices made from different nanoporous materials (FIG. 2, Row (iv)); 2) changing the ambient humidity led to expected change in $\Delta W_{H2O}\%$ (at fixed film thickness) and thus change in $V_o$, with $\Delta W_{H2O}\%$ and $V_o$ following the same trend in different devices. The previous deprotonation model can be included in this model by considering that the deprotonation is equivalent to negative charge donation, with proton being considered as the diffusive imaging charge.

Third, the dynamic adsorption-desorption exchange, with differentiated rate between the outer and inner interfaces, supplies continuous charging to balance the leakage in material (e.g., induced by $V_o$). This is supported by experiments which showed that 1) increasing the humidity level, hence the water exchange rate or charging rate, increased the current output, and 2) blocking and resuming the water exchange reversibly switched the electric output (FIGS. 13A-B).

A 'leaky capacitor' model, based on the above rationales, is proposed to substantiate the mechanistic description (FIG. 5C, shaded region). In this model, the continuous charging from air humidity is represented by a current source $I_s$; the charge difference between the top and bottom electrodes is equated to charge stored in a capacitor (C); the route of leaky current ($I_{leak}$) induced by voltage output (V) is represented by a resistor ($R^{dev}$). Note, $R^{dev}$ is the intrinsic carrier resistance in material but not the typically measured resistance containing multiple contributions (FIGS. 14A-14B).

This model can be used to describe the current generation behaviors in air-gen devices. At any steady state, the charging current shall cancel the leaky current. In an open circuit, this yields a steady voltage output $$V_o = I_s \cdot R^{dev} \left( \text{e.g., from } I_s = I_{leak} = \frac{V_o}{R^{dev}} \right).$$

An external load Rz introduces an additional 'leaky' current corresponding to the measured current (I). The new steady state will produce a voltage output $$V = \frac{R_L}{R^{dev} + R_L} \cdot V_o \left( \text{e.g., from } I_s = I_{leak} + I = \frac{V}{R^{dev}} + \frac{V}{R_L} \right).$$

This voltage reduction, corresponding to a reduction in charge storage in the capacitor C, produce a discharging current featuring the typical decaying trend (FIG. 5D, light shaded region). Once the new steady state is reached, the measured current I obeys Ohm's law to yield a sustaining value $$I = \frac{V}{R_L} = \frac{V_o}{R^{dev} + R_L} = \frac{R^{dev}}{R^{dev} + R_L}.$$

$I_s$ (FIG. 5D, dark shaded region), which is the result of the continuous charging $I_s$ from the air humidity. Disconnecting the external load shuts off the external leaky route and shift the dynamics to a net charging to C, which restores the initial voltage.

The above predicted current behaviors were consistently observed in air-gen devices made from different materials. Representative results from an air-gen made from GOx film showed that the current decayed within the first hour (FIG. 5E, light grey shaded region) but maintained a stable value for the following 12 h (dark grey shaded region). Disconnecting the two electrodes gradually restored the voltage output (black curve). The cycle was repeated beyond the test time of 10 days (FIG. 5F). The current is unlikely to come from any internal redox process, consistent with the experimental result that water was not consumed during the process. This provides evidence that the main diffusion carrier type may be electron or hole (FIGS. 14A-14B), which does not require a redox in the material or at the electrode to sustain the closed-loop current flow. Together, the model and experimental results support a sustainable mechanism in air-gen devices.

This sustainable mechanism is inherently different from the non-sustainable mechanism involved in previous devices, in which a gradual net adsorption in the materials induced a temporary gradient to induce current (e.g., through the induction of an ionization gradient), but the current ceased once an adsorption saturation was reached. These devices could only offer a one-time current output no longer than 48 h. All the devices tested here showed continuous current production in test window of one week (FIG. 15). In fact, an air-gen device made from protein nanowires, which was kept in the ambient environment for over 3 years, still produced similar voltage output. These time spans are much longer than expected adsorption time, supporting the sustainable mechanism based on a dynamic equilibrium (FIGS. 5A-5B). The air-gen device is not a 'perpetual motion engine', because the energy comes from electrostatic energy (not kinetic) of discrete water molecules in a vast open source. The asymmetric device structure leads to differentiated contact rate (FIG. 1), and thus, differentiated charging to the top and bottom interfaces from water molecules (FIG. 5B) under dynamic equilibrium. The exchanging water molecules from the open air may be considered as 'incidental' source like light to a solar cell. If this exchanging process was blocked by sealing the top interface the energy output was stopped, but it resumed once the seal was removed (FIGS. 13A-13B).

Example 4. Heterogeneous Air-Gen Devices

The proposed mechanism readily predicts that the connection of two materials having dissimilar charging capacity from air humidity can also yield a leaky capacitor that generates electricity. For demonstration, we connected GOx films to other films made from biomaterials (e.g., FIG. 6, row A), because they had distinct charging efficiency inferred from the $E/\nabla_{H2O}$ ratio (FIG. 4, inset). All devices produced sustained $V_o$ in the ambient environment. The values are considerably larger than those from devices of heterogeneous surface functionalization, but the material processing and choice here are much easier and broader. The GOx terminal was recorded with a positive voltage with respect to the biomaterial terminal, consistent with the expectation that biomaterials have better charging efficiency (FIG. 4, inset).

In another test to further substantiate the mechanistic picture, GOx films of different thicknesses were vertically stacked on a film (0.9 μm thick) made from protein nanowires (e.g., FIG. 6, row B). At reduced thickness (~1.2 μm), the GOx film was not expected to substantially block water exchange in the bottom layer. The protein nanowire layer thus could still be charged more than the GOx layer, producing a substantial $V_o \sim 150$ mV (FIG. 6, B(i)). Increasing the GOx film thickness (~2.4 μm) was expected to reduce the charging in the nanowire layer, yielding a decreased $V_o \sim 30$ mV (FIG. 6, B(ii)). Further increasing the GOx film thickness (~3.6 μm) reduced the charging in the nanowire layer to be below that in GOx film, yielding a reverse $V_o \sim -130$ mV (FIG. 6, B(iii)). The varying amplitude also shows that the voltage output is not a chemical battery effect between different materials. These results provide not only strong support to the mechanistic model proposed but also broad engineering strategies for the air-gen technology.

Example 5. Material Preparation and Device Fabrication

Material preparation. PEDOT nanofibers were synthesized by using a soft-template approach reported previously. Briefly, the templates were formed by adding 30 mM FeCl3 solution into 30 mM sodium dodecyl sulfate (SDS, Sigma-Aldrich) solution at 50° C. 10 mM 3,4-Ethylenedioxythiophene (EDOT, Tokyo Chemical Industry Co., Ltd.) monomers were then slowly introduced into the solution with continuous stirring for 6 h. The obtained nanofibers were washed by repeated process of centrifugation (5000 rpm, 20 min) and redispersion in methanol and water. Silk fibroin (SF) was extracted from silkworm cocoons (Oregon Silkworms) following a procedure described previously. Briefly, silk cocoons (5 g) were boiled in 0.02 M Na2CO3 for 30 min. The obtained fibers were rinsed in deionized (DI) water (20 min, 3 times) and dried overnight. The raw silk fibroin was then dissolved in 9.3 M LiBr (Acros Organics™) and incubated at 60° C. for 4 h. The solution was dialyzed in DI water for 48 h. Wild-type *G. sulfurreducens* was grown as previously described under anaerobic conditions with acetate as the electron donor and fumarate as the electron acceptor. Protein nanowires were synthesized and harvested following previous methods. Cellulose nanofibrils (3 wt % in water, Cellulose Lab) and graphene oxide (0.4 wt % in water, MSE Supplies™) were commercially produced.

Device fabrication. The bottom electrode (Ti/Au, 5/30 nm, 1×15 mm2) was patterned by a shadow mask and defined with standard metal deposition on a glass slide (25×75 mm2; Fisher Scientific). A 5×5 mm2 area was defined by scotch tape. Solution containing the material of interest was drop-casted in the defined area and dried at ~80° C. to form the thin film. The film thickness was controlled by solution volume. For *G. sulfurreducens* biofilm, a polyimide substrate patterned with Au electrode was placed on a filter paper (42.5 mm dia., 8 μm pore size; Whatman). The *G. sulfurreducens* culture solution was filtered through the paper to form biofilm on electrode. A braided gold-plated shield (~ 0.7 mm diameter, model CC-SC-50; LakeShore) was used as the top electrode for all the films for electrical measurements.

For a (planer) heterojunction device, a pair of carbon electrodes (1×15 mm2) were defined by a laser writer (LaserPro Spirit GLS; GCC) on a polyimide substrate. Scotch tape was used to define the area (2×5 mm2) for each material before film deposition. For a vertical device, the carbon electrodes were defined the same way on a polyimide substrate. Thin films were deposited on one of the electrodes by dropcasting. The other carbon electrode was cut into thin stripe (1×15 mm2) and placed on top of the film layers to serve as the top electrode.

Humidity control. The tuned RH in some experiments was controlled by tuning the concentration of calcium chloride solutions and monitored by a hygrometer (model 8706; Reed Instruments).

Measurement of moisture adsorption. The moisture adsorption in thin films was measured by a quartz crystal microbalance (CHI 440, CH Instruments). The film was deposited on the quartz crystal resonator by dropcasting. The film weight was initially measured at a controlled humidity of 50% and then at humidity ~0% (by flowing dry air). The weight difference corresponded to the weight of adsorbed water.

Characterizations. The SEM images were acquired by using a JSM-7001F system. Film thicknesses were determined by a 3D profiler (NewView™ 9000; Zygo). The voltage and current outputs were measured by using a source meter (Keithley 2401; Tektronix) interfaced with computerized recording software. The measurements were performed in the ambient environment, unless otherwise specified.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An energy harvesting device, comprising:
an adsorption layer comprising a nanoporous material, the nanoporous material comprising a nonbiological nanoporous material, wherein the nonbiological nanoporous material is an organic material;
at least two electrodes in operative arrangement with the adsorption layer, the adsorption layer and at least two electrodes configured to generate a voltage differential on exposure of the adsorption layer to ambient moisture.

2. The energy harvesting device of claim 1, wherein the nonbiological organic nanoporous material is selected from the following: poly(3,4-ethylenedioxythiophene) (PEDOT), poly(3-hexylthiophene) (P3HT), polyvinyl alcohol (PVA), Polylactic acid (PLA), poly vinyl phenol (PVP), Polyacrylonitrile (PAN), metal organic frameworks (MOFs).

3. The energy harvesting device of claim 1, wherein the nanoporous material is configured to generate an adsorption gradient of $H_2O$ within the device on exposure to humidity.

4. The energy harvesting device of claim 1, wherein the nanoporous material comprises nanoscale structures defining pores of less than about 500 nm.

5. The energy harvesting device of claim 4, wherein the nanoporous material comprises nanoscale structures defining pores of less than about 200 nm.

6. The energy harvesting device of claim 4, wherein a thickness of the adsorption layer is in a range of about 0.5 μm to about 500 μm.

7. The energy harvesting device of claim 6, wherein the pores extend through the thickness of the adsorption layer.

8. The energy harvesting device of claim 1, further comprising a storage element configured to store energy from current supplied by the adsorption layer and the at least two electrodes.

9. The energy harvesting device of claim 1, wherein the nanoporous material comprises at its surface at least one surface group capable of interacting with water molecules.

10. The energy harvesting device of claim 9, wherein the surface group is a hydroxyl group, a carbonyl group, a carboxyl group, or an amino group.

11. The energy harvesting device of claim 1, wherein the at least two electrodes are disposed at opposing surfaces of the adsorption layer, at opposing ends of the adsorption layer, or a combination thereof.

12. An energy harvesting device, comprising:
a heterogeneous adsorption layer comprising at least two nanoporous materials, each nanoporous material comprising a nonbiological nanoporous material, wherein the nonbiological nanoporous material is an organic material;
at least two electrodes in operative arrangement with the adsorption layer, the adsorption layer and at least two electrodes configured to generate a voltage differential on exposure of the adsorption layer to ambient moisture.

13. The energy harvesting device of claim 12, wherein the at least two nanoporous materials are vertically arranged with respect to one another, are arranged in a planar format with respect to one another, or are arranged in a combination thereof.

14. A method of harvesting energy from ambient moisture, comprising:
exposing an adsorption layer comprising a nanoporous material to ambient moisture, the nanoporous material comprising a nonbiological nanoporous material, wherein the nonbiological nanoporous material is an organic material;
with at least two electrodes in operative arrangement with the adsorption layer, generating a voltage differential on exposure of the adsorption layer to the ambient moisture.

15. The method of claim 14, further comprising storing energy from current supplied by the adsorption layer and the at least two electrodes.

* * * * *